US012779640B2

(12) United States Patent
Hancock

(10) Patent No.: US 12,779,640 B2
(45) Date of Patent: Nov. 3, 2026

(54) APPARATUSES AND LOCKING ELEMENTS INCLUDING ASSIST DEVICES

(71) Applicant: Truck Shields, LLC, Salt Lake City, UT (US)

(72) Inventor: Dennis H. Hancock, Evanston, WY (US)

(73) Assignee: Truck Shields, LLC, Salt Lake City, UT (US)

( * ) Notice: Subject to any disclaimer, the term of this patent is extended or adjusted under 35 U.S.C. 154(b) by 494 days.

(21) Appl. No.: 18/453,486

(22) Filed: Aug. 22, 2023

(65) Prior Publication Data

US 2023/0398822 A1 Dec. 14, 2023

Related U.S. Application Data

(63) Continuation-in-part of application No. 17/454,601, filed on Nov. 11, 2021, now Pat. No. 11,813,905, which is a continuation of application No. 17/132,808, filed on Dec. 23, 2020, now Pat. No. 11,766,904, which is a continuation of application No. 15/718,366, filed on Sep. 28, 2017, now Pat. No. 10,906,368, which is a continuation-in-part of (Continued)

(51) Int. Cl.

| | |
|---|---|
| ***B25B 27/08*** | (2006.01) |
| ***B25B 27/20*** | (2006.01) |
| ***B25G 1/10*** | (2006.01) |
| ***B60D 1/02*** | (2006.01) |
| ***F16B 21/12*** | (2006.01) |

(52) U.S. Cl.

CPC .............. *B25B 27/08* (2013.01); *B25B 27/20* (2013.01); *B25G 1/102* (2013.01); *B60D 1/025* (2013.01); *F16B 21/12* (2013.01)

(58) Field of Classification Search

CPC .............. F16B 2/12; B60D 1/025; B60D 1/02

USPC .................................................. 280/515, 507

See application file for complete search history.

(56) References Cited

U.S. PATENT DOCUMENTS

| | | | |
|---|---|---|---|
| 767,156 | A | 8/1904 | Lemos |
| 872,180 | A | 11/1907 | Hite |
| 1,119,807 | A | 12/1914 | Carter |

(Continued)

FOREIGN PATENT DOCUMENTS

| | | |
|---|---|---|
| CN | 302787205 | 4/2014 |
| DE | 2710842 A1 | 9/1978 |

(Continued)

OTHER PUBLICATIONS

Amazon.com: Pin Wiz Trailer Hitch Clip, oldest review 2018, https://www.amazon.com/Pin-Wiz-Trailer-Hitch-Black/dp/B079QQ9PK5/ref-ref_cm_cr_arp_d_product_top?ie=UTF8, site visited Aug. 17, 2018 (Year: 2018; 13 pages.

(Continued)

*Primary Examiner* — Jason L Vaughan

(74) *Attorney, Agent, or Firm* — Dorsey & Whitney LLC

(57) ABSTRACT

A pin assist device that eliminates the need to use a separate tool to insert and/or extract a cotter, or other fastening, pin. The pin assist device allows the user to easily insert or extract a pin in locations that are difficult to reach, in all types of weather and virtually all conditions. The pin assists device may be removably attachable to the pin. Related pin assist devices, hitch pins, and hitch pin assemblies are also disclosed.

20 Claims, 14 Drawing Sheets

Related U.S. Application Data application No. 15/418,442, filed on Jan. 27, 2017, now abandoned.

(60) Provisional application No. 62/344,902, filed on Jun. 2, 2016.

(56) References Cited

U.S. PATENT DOCUMENTS 1,280,756 A 10/1918 Kelecom
1,429,353 A 9/1922 Karsky
1,562,521 A 11/1925 Schlegel
RE16,820 E 12/1927 Estwing
1,849,605 A 3/1932 Whitlock
1,916,856 A 7/1933 Copeman
2,166,614 A 7/1939 Strid
2,180,558 A * 11/1939 Stastny .................... B60D 1/02 278/96
D118,329 S 12/1939 Crowley
2,400,960 A 5/1946 Strid
2,588,731 A 3/1952 Kabanuck
2,593,935 A 4/1952 Sweat
2,796,661 A 6/1957 Tuttle
3,011,801 A * 12/1961 Arthur ..................... B60D 1/02 411/347
3,151,512 A 10/1964 Walter
3,728,775 A 4/1973 Hosbach
3,807,002 A 4/1974 Green
3,937,442 A 2/1976 Martin et al.
D241,806 S 10/1976 Johnson
4,037,513 A 7/1977 Hobson
4,087,112 A 5/1978 Lee
4,172,523 A 10/1979 Weglage
4,298,212 A 11/1981 Jamison
D263,788 S 4/1982 McKinnon et al.
D270,517 S 9/1983 Raskin
4,412,464 A 11/1983 Cook
D276,787 S 12/1984 Burns
D278,203 S 4/1985 Braukmann
D278,436 S 4/1985 Storlie
4,526,396 A 7/1985 Mayer
4,541,311 A 9/1985 Trammell
D281,389 S 11/1985 Summers
4,553,737 A 11/1985 Yi
4,555,125 A 11/1985 Goodlove
D284,935 S 8/1986 Shaw
4,624,619 A 11/1986 Uher
4,671,528 A 6/1987 Thompson
D294,330 S 2/1988 Keck
4,765,037 A 8/1988 Perry
4,773,805 A 9/1988 Krahling
D298,711 S 11/1988 Lowance
4,840,528 A 6/1989 Doom
4,890,854 A 1/1990 Hoover
D306,144 S 2/1990 Haggstrom
D308,620 S 6/1990 Baca
D318,406 S 7/1991 Gabriele
D320,542 S 10/1991 McCord
5,090,277 A 2/1992 Spiller
5,150,504 A 9/1992 Cohen
5,205,144 A 4/1993 Montano
5,267,494 A 12/1993 Waluda
D356,763 S * 3/1995 Herrick ........................ D12/162
5,509,380 A 4/1996 Tipp
5,524,511 A 6/1996 Taka
5,557,832 A 9/1996 Vanden
5,662,446 A 9/1997 Haan
D386,056 S 11/1997 Streeter
D389,624 S 1/1998 Drimmie et al.
5,784,760 A 7/1998 Leitzke et al.
D396,885 S 8/1998 Shyu
D401,969 S 12/1998 Ho
D405,019 S 2/1999 Neuman
5,979,015 A 11/1999 Tamaribuchi
6,145,866 A 11/2000 Peter
6,409,152 B1 6/2002 Bagley
D480,283 S 10/2003 Brown
D497,576 S 10/2004 Wang
6,837,807 B1 1/2005 Kerr
7,131,657 B1 11/2006 Witt
D535,181 S 1/2007 Roychowdhury
7,306,275 B2 12/2007 Kalous
D560,565 S 1/2008 Kalous
D570,257 S 6/2008 Vanderburgh et al.
7,644,485 B2 1/2010 Muller et al.
D650,785 S 12/2011 Terwilliger et al.
8,201,844 B1 6/2012 Smoot
8,240,695 B1 8/2012 Liu
8,267,420 B2 9/2012 Merten et al.
8,388,366 B2 3/2013 Yang
D681,439 S 5/2013 Chen
D693,660 S 11/2013 Hackett et al.
8,677,574 B1 3/2014 Thiessen et al.
8,764,587 B2 7/2014 Sinanis et al.
D713,709 S 9/2014 Goldman et al.
8,873,921 B2 10/2014 Lee et al.
D719,822 S 12/2014 Van
D724,914 S 3/2015 Tipp
9,090,136 B2 7/2015 Breeden et al.
9,151,907 B2 10/2015 Jiang et al.
D749,994 S 2/2016 Verboeket
D754,512 S 4/2016 Nelson
9,669,276 B1 6/2017 Maloy
D796,307 S 9/2017 Smith et al.
D797,009 S 9/2017 Verboeket
D810,517 S 2/2018 Singer
D823,415 S 7/2018 Zwart
D841,523 S 2/2019 Ford
D847,037 S 4/2019 Hancock
D866,412 S 11/2019 Williams
10,780,751 B2 9/2020 Sartin
10,890,204 B1 1/2021 Vela
10,906,368 B2 2/2021 Hancock
D914,551 S 3/2021 Merten et al.
D927,366 S 8/2021 Repic et al.
D931,719 S 9/2021 Hancock
D942,334 S 2/2022 Wang
D943,468 S 2/2022 Wang
D945,945 S 3/2022 Hu
D949,064 S 4/2022 Kyeong
D955,302 S 6/2022 Moore et al.
11,376,902 B2 7/2022 Chance
D962,131 S 8/2022 Wen
D962,832 S 9/2022 Huang
D963,525 S 9/2022 Smith
D964,222 S 9/2022 Zhou
D964,223 S 9/2022 Olaru
D967,741 S 10/2022 Wyers
D971,090 S 11/2022 Campanella
D985,433 S 5/2023 Esteves
D992,467 S 7/2023 Hancock
D993,137 S 7/2023 Mccain
D997,044 S 8/2023 Pimlott et al.
2004/0164516 A1 8/2004 Baginski
2005/0262677 A1 12/2005 Tanaka et al.
2006/0078374 A1 4/2006 Wrase et al.
2006/0147297 A1 7/2006 Wrase et al.
2007/0007782 A1 1/2007 Kalous
2007/0062006 A1 3/2007 Wright
2007/0087920 A1 4/2007 Dachraoui et al.
2007/0251059 A1 11/2007 You
2009/0044847 A1 2/2009 Barangan
2009/0089972 A1 4/2009 Gill et al.
2009/0115166 A1 5/2009 Goettker
2009/0163300 A1 6/2009 Lueders
2009/0181808 A1 7/2009 Tate
2009/0278334 A1 11/2009 Carr et al.
2010/0022330 A1 1/2010 Rourke et al.
2010/0200333 A1 8/2010 Maurice et al.
2013/0171864 A1 7/2013 Farris-Gilbert et al.
2013/0205557 A1 8/2013 Macarthur et al.
2014/0331464 A1 11/2014 Jiang et al.
2015/0028565 A1 1/2015 Bowe
2016/0129847 A1 5/2016 Mehlen

(56) References Cited

U.S. PATENT DOCUMENTS

| | | | |
|---|---|---|---|
| 2017/0087946 | A1 | 3/2017 | Fincher |
| 2017/0348838 | A1 | 12/2017 | Hancock |
| 2018/0015797 | A1 | 1/2018 | Hancock |
| 2018/0029207 | A1 | 2/2018 | Hieronymus |
| 2018/0147715 | A1 | 5/2018 | Promo et al. |
| 2021/0129608 | A1 | 5/2021 | Bowe et al. |
| 2022/0032140 | A1 | 2/2022 | Regalado |

FOREIGN PATENT DOCUMENTS

| | | | |
|---|---|---|---|
| EM | 007877162-0001 | | 5/2020 |
| JP | 4546949 | B2 | 7/2010 |
| JP | 5220149 | B2 | 3/2013 |
| WO | 2006138371 | A2 | 12/2006 |

OTHER PUBLICATIONS

Buyers Hitch Pin, Johnsons surplus website 2023, site visited Apr. 25, 2023, https://www.johnsonssurplus.com/buyers-hitch-pin-w-cotter-1-x-6-1-4-66125.html.

Cotter hair pin Details—175-2106—USA-CLEAN, website 2018, site visited Aug. 17, 2018, https://usafix.usaclean.com/..,m_adwords&gclid_CjOKCGjw5NnbBRDaARIsAJP-YR_UW77SZTGUF2JSm9PxkkOaDakw9H-ZPFomLCCZULNJTk-G3rR91UaAsZxEALw_wcB (Year:2018); 7 pages.

Durometer Shore Hardness Scale for Rubbers.

Hand Moldable Plastic Molding a Handle published on May 9, 2011 at https://www.youtube.com/watch? v=RGSKSDdWIKw (Year:2011).

Nordel EPDM Product Selection Guide; The Dow Chemical Company, Apr. 2014.

Pin Whiz, Rhino Hitch website 2022, site visited Jul. 2, 2022, https://rhinohitch.com/products/pin-wiz?variant=36191009570977& currency= US D&utm_med i um =product.

Pin Wiz Trailer Hitch Clip and Hitch Pin.

Suregrip TM L-Handle Hitch Pin Lock; Found at https://www.resses-hitches.com/prodcuts/suregrip_tradeChrome, 3015-049 (Year:2019).

Thomas, Sabu Maria, Hanna J. Joy, Jithin Chan, Chin Han Pothen, Laly A.. (2014), Natural Rubber materials, vol. 2—Composites and Nanocomposites—15.4.2.1 Hardness Type Shore A. Royal Society of Chemistry.

* cited by examiner

APPARATUSES AND LOCKING ELEMENTS INCLUDING ASSIST DEVICES

CROSS-REFERENCE TO RELATED APPLICATIONS

This application is a continuation-in-part of U.S. patent application Ser. No. 17/454,601, filed Nov. 11, 2021, and titled "APPARATUSES AND LOCKING ELEMENTS INCLUDING ASSIST DEVICES," pending, which is a continuation of U.S. patent application Ser. No. 17/132,808, filed Dec. 23, 2020, and titled "APPARATUSES AND LOCKING ELEMENTS INCLUDING ASSIST DEVICES," pending, which is a continuation of Ser. No. 15/718,366, filed Sep. 28, 2017, and titled "PIN ASSIST DEVICES, HITCH PINS, AND HITCH PIN ASSEMBLIES," now U.S. Pat. No. 10,906,368, which is a continuation-in-part of U.S. patent application Ser. No. 15/418,442, filed Jan. 27, 2017, and titled "COTTER PIN ASSIST DEVICE," abandoned, which claims the benefit of U.S. Provisional Patent Application Ser. No. 62/344,902, filed Jun. 2, 2016, the disclosure of each of which applications is hereby incorporated herein in their entirety by this reference.

FIELD

Embodiments disclosed herein relate generally to pin insertion and extraction devices and assemblies utilizing the pin insertion and extraction devices. More specifically, embodiments disclosed herein related to pin assist devices for use with one or more types of retaining pins configured to assist a user in inserting and removing a retaining pin associated with the pin assist device without the need of an external tool.

BACKGROUND

A cotter pin (also known as an R-pin, cotter pin, or hairpin cotter pin) is a fastener made of springy material, usually hardened metal wire. Cotter pins are commonly used to secure the ends of round shafts such as axles and clevis pins. Cotter pins may include a straight leg connected to a bent leg. The straight leg of the cotter pin is pushed through a hole at one end of a shaft until the middle, or belly, of the bent leg grips the side of the shaft away from the straight leg. The cotter pin is usually bent so that it remains in constant tension and will not come loose from the hole into which it has been inserted without the user applying some force to remove. The end of the bent leg most often is built to point away from the straight leg to facilitate insertion of the cotter pin.

Cotter pins are frequently used in connecting various components and can be located in recessed locations with limited access that hinder a user's ability to insert and extract the cotter pin. Some have attempted to solve the problem of inserting and extracting a cotter pin by designing tools that are separate from the cotter pin, such as cotter pin extracting pliers. In a typical scenario, a cotter pin is used to secure a ball mount hitch to a receiver tube on a vehicle. Once the hitch is inserted into the receiver tube, a hitch pin is inserted through holes located in both the hitch and receiver. A. cotter pin is then inserted into a hole in the hitch pin to prevent the hitch pin from falling out. When dealing with this scenario, the last thing a user should have to worry about is locating a tool to help with the insertion and extraction of the cotter pin. In addition, such a tool is often useless in facilitating the insertion of a cotter pin.

Similarly, other retaining pins also encounter similar problems. For example, linchpins, trailer safety pins, snap pins, and other retaining members may require additional tools to assist in the insertion and extraction thereof. These pins all utilize mechanical force, such as a spring, to form a latch or stop to retain (e.g., lock) the retaining pin in place.

In addition to being located in difficult to reach areas, such retaining pins often rust and bind to the shaft or member that they are intended to retain in place. Rusting of the retaining pins increases a difficulty of withdrawing the retaining pin from the shaft and removing the shaft (e.g., a hitch pin) from, for example, a hitch receiver.

BRIEF SUMMARY

Embodiments disclosed herein include pin assist devices, hitch pins, and hitch pin assemblies including the hitch pins and pin assist devices. For example, in accordance with one embodiment, a pin assist device comprises an insertion end operably coupled to a retaining pin, an extraction end opposite the insertion end, the extraction end comprising a gripping element, and a middle portion between the insertion end and the extraction end, the middle portion having a thickness less than a thickness of each of the insertion end and the extraction end.

In additional embodiments, a hitch pin assembly comprises a hitch pin and a retaining pin. The hitch pin comprises an elongate portion comprising a retaining pin receiver on a distal end thereof, and a bent portion comprising a gripping element, the gripping element comprising at least one protrusion in a direction toward the distal end of the elongate portion. The retaining pin comprises a portion configured to engage the retaining pin receiver, a latching element configured to retain the retaining pin in the retaining pin receiver, and a pin assist device comprising a flexible material coupled to at least one of the retaining pin and the latching element.

In further embodiments, a hitch pin comprises a cylindrical elongate shaft having a proximal end and a distal end, a retaining pin receiver at the distal end of the cylindrical shaft, and a handle extending away from the proximate end of the cylindrical elongate shaft at an angle. The handle comprises a protrusion on a base of the handle, the protrusion protruding in a direction toward the distal end of the cylindrical elongate shaft, and a gripping element comprising a resilient material around at least a portion of the handle, the gripping element having a curved surface configured to receive a finger of a user.

DETAILED DESCRIPTION

Figure 1:
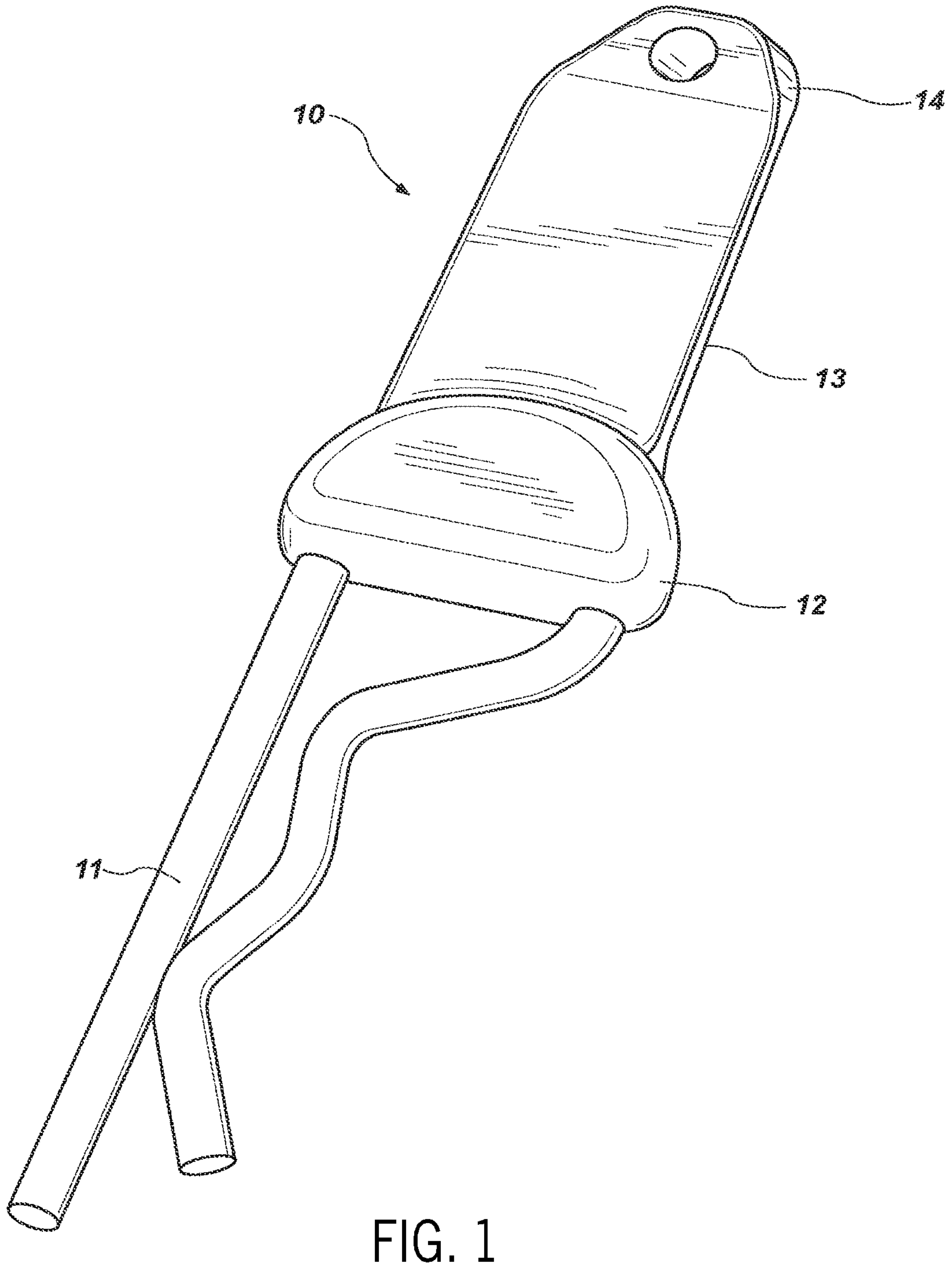
FIG. 1 is a perspective view of a pin assist device, in accordance with embodiments of the disclosure.

The illustrations presented herein are not meant to be actual views of any particular pin assist device, retaining pin including the pin assist device, hitch pin or component thereof, but are merely idealized representations employed to describe illustrative embodiments. The drawings are not necessarily to scale.

As used herein, the term “retaining member” means and includes a structure configured for retaining and/or locking another structure, such as, for example, a shaft, in place. By way of nonlimiting example, a retaining member may include a locking pin (e.g., a round lock pin, a square lock pin, etc.), a linchpin, a cotter pin, a clip, a plunger pin, a decent pin, a clevis pin, another type of retaining member, another pin for retaining, for example, a hitch pin, in place. As used herein, the terms “retaining member” and “retaining pin” are used interchangeably.

As used herein, the term “retaining member assist device” means and includes a device coupled to or configured to be coupled to a retaining member. A retaining member assist device may be configured to facilitate insertion and extraction of a retaining member associated with the retaining member assist device into or from another structure (e.g., a shaft). As used herein, the terms “retaining pin assist device,” “retaining member assist device,” and “pin assist device” are used interchangeably.

Embodiments disclosed herein provide a pin assist device that is attached to a retaining pin and provides a means for a user to effectively grip the retaining pin to either insert or extract it without having to locate and use a separate tool.

Some embodiments disclosed herein are directed to a retaining pin that includes an insertion portion for grasping the retaining pin to allow for easy insertion thereof into a hitch pin without using a separate tool.

Additional embodiments disclosed herein are directed to a device that includes an extraction portion that allows for easy removal of the retaining pin from a hitch without using a separate tool.

An embodiment of a device that can be easily grasped by the user to insert or extract the retaining pin is described. An advantage of the device is that the insertion function and extraction function can be accomplished by a single device that is attached to the retaining pin.

The embodiments described herein may be embodied in the form illustrated in the accompanying drawings. The drawings, however, are illustrative only. Variations are contemplated as being part of the invention, limited only by the scope of the claims.

The embodiments disclosed herein relate generally to pin assist devices for use with retaining pins such as cotter pins, linchpins, locking pins, retaining pins, plunger pins, detent pins, clevis pins, and other locking or retaining pins. Embodiments of the disclosure further relate to retaining pins, such as cotter pins, linchpins, locking pins, plunger pins, detent pins, and clevis pins including the pin assist devices. Embodiments of the pin assist device may enable a user to more easily manipulate, grip, insert and remove the associated retaining pin from another member, such as a hitch pin or a trailer hitch (e.g., a draw bar), a hitch receiver, etc. The pin assist device may improve a user's ability to manipulate the associated pin while wearing gloves.

Some embodiments relate to hitch pins including a gripping element, which hitch pins may be used with the pin assist device and associated retaining pin. Hitch pins with the gripping element may facilitate easier insertion and extraction of the hitch pin compared to conventional hitch pins.

FIG. 1 illustrates a pin assist device 10 (e.g., a cotter pin 11) attached to a pin assist device 10. In a preferred embodiment, the pin assist device 10 is made out of a flexible material (e.g., resilient material) and is fixedly attached to the cotter pin 11. The pin assist device 10 includes an insertion end 12 (e.g., a coupling end), an extraction end 14 (e.g., a gripping end), and a middle section 13 connecting the insertion end 12 to the extraction end 14. The end of the cotter pin 11 is encased in the flexible material, which material is thicker around the cotter pin 11 and the insertion end 12, tapers off in the middle section 13 and is thicker again at the extraction end 14. In other words, the pin assist device 10 has a greater thickness at the insertion end 12 and the extraction end 14 and a lesser thickness at the middle section 13.

In some embodiments, the thickness of the extraction end 14 may be between about 2 mm and about 10 mm, such as between about 2 mm and about 4 mm, between about 4 mm and about 6 mm, between about 6 mm and about 8 mm, or between about 6 mm and about 8 mm. However, the disclosure is not limited to a particular thickness of the extraction end 14. In some embodiments, the thickness of the extraction end 1.4 is between about 7 mm and about 8 mm.

The thickness of the middle section 13 may be between about 2 mm and about 6 mm, such as between about 2 mm and about 3 mm, between about 3 mm and about 4 mm, between about 4 mm and about 5 mm, or between about 5 mm and about 6 mm. In some embodiments, the thickness of the middle section 13 is about 3 mm. In some embodiments, the thickness of the middle section 13 may be equal to about half a thickness of the extraction end 14.

The thickness of the insertion end 12 may be between about 2 mm and about 10 mm, such as between about 2 mm and about 4 mm, between about 4 mm and about 6 mm, between about 6 mm and about 8 mm, or between about 6 mm and about 8 mm. However, the disclosure is not limited to a particular thickness of the extraction end 14. In some embodiments, the thickness of the insertion end 12 is between about 7 mm and about 8 mm. In some embodiments, the thickness of the insertion end 12 is equal to about the thickness of the extraction end 14.

The difference in thickness between the insertion end 12 and middle section 13 may provide a grip that a user may hold, for example, when inserting the cotter pin 11 into another structure (e.g., into a hitch pin). The difference in thickness between the insertion end 12 and the middle section 13 may also provide stability to the cotter pin 11 when it is inserted into the another structure. While it may be useful to vary the thickness between the insertion end 12 and middle section 13 of the pin assist device 10 in some embodiments, the pin assist device 10 can also be made of a uniform thickness.

The pin assist device 10 may include one or more elements to facilitate gripping thereof by a user. In some embodiments, a gripping portion of the pin assist device 10 may be defined by the middle section 13 and the extraction end 14. By way of nonlimiting example, the pin assist device 10 may include a textured surface including one or more bumps, ridges, grooves, holes, protrusions, etc. In some embodiments, the extraction end 14 and the middle section 13 may include the gripping elements. In some embodiments, the material of the pin assist device 1.0 may comprise a material exhibiting a high surface roughness. In some embodiments, the material of the pin assist device comprises a high friction material, such as a material having a coefficient of static friction between about 0.7 and about 1.3, such as between about 0.7 and about 0.9, between about 0.9 and about 1.1, or between about 1.1 and about 1.3. In some embodiments, the coefficient of static friction may be between about 1.1 and about 1.2.

The durometer of the pin assist device 10 may be varied to increase or decrease the tension (e.g., the rigidity) of the cotter pin 11. For instance a material with a higher durometer may cause the tension in the cotter pin 11 to be stronger (e.g., higher), making the cotter pin 11 more difficult to insert or withdraw. A material with a lower durometer may cause less tension in the cotter pin 11, making it easier to insert or withdraw. Depending on how the cotter pin 11 is used, the durometer of the material may be varied to best meet the user's desired purpose.

As used herein, a durometer of a material means and includes a type A durometer of the material, as measured using, for example, the ASTM D2240 standard test method for measuring durometer.

In some embodiments, the durometer of the pin assist device 10 material may be between about 30 and about 100, such as between about 30 and about 40, between about 40 and about 50, between about 50 and about 60, between about 50 and about 60, between about 60 and about 70, between about 70 and about 80, between about 80 and about 90, or between about 90 and about 100. In some embodiments the durometer of the pin assist device 10 material may be between about 75 and about 85. In some embodiments, the durometer may be about 80. The pin assist device 10 may comprise rubber, silicon, nylon, rope, leather, and combination thereof.

In use and operation, when it is desired to remove the cotter pin 11, the user grasps the extraction end 14 of the pin assist device 10, which has a grip that results from the flexible material on the extraction end 14 being thicker than the middle section 13 of the pin assist device 10. Instead of reaching for a separate tool like a pair of pliers or a screwdriver, the user simply grabs the raised extraction end 14 and pulls to remove the cotter pin 11. Often in circumstances when a cotter pin is being utilized, the user will be wearing gloves. Because of the tapered ends (i.e., the insertion end 12 and the extraction end 14 or, a transition from the middle section 13 to each of the insertion end 12 and the extraction end 14) of the pin assist device 10, a user can easily insert or extract a cotter pin 11 with or without gloves. The user can also extract the cotter pin 11 from various angles because of the flexibility of the pin assist device 10. This is particularly useful when the desired pin assist device 10 to be removed is in a hard to reach location. The user can simply grasp the extraction end 14 of the pin assist device 10 and pull to extract the cotter pin 11 without the need to pull in a direction that is parallel to the pin (e.g., parallel to the legs of the cotter pin 11).

Figure 2:
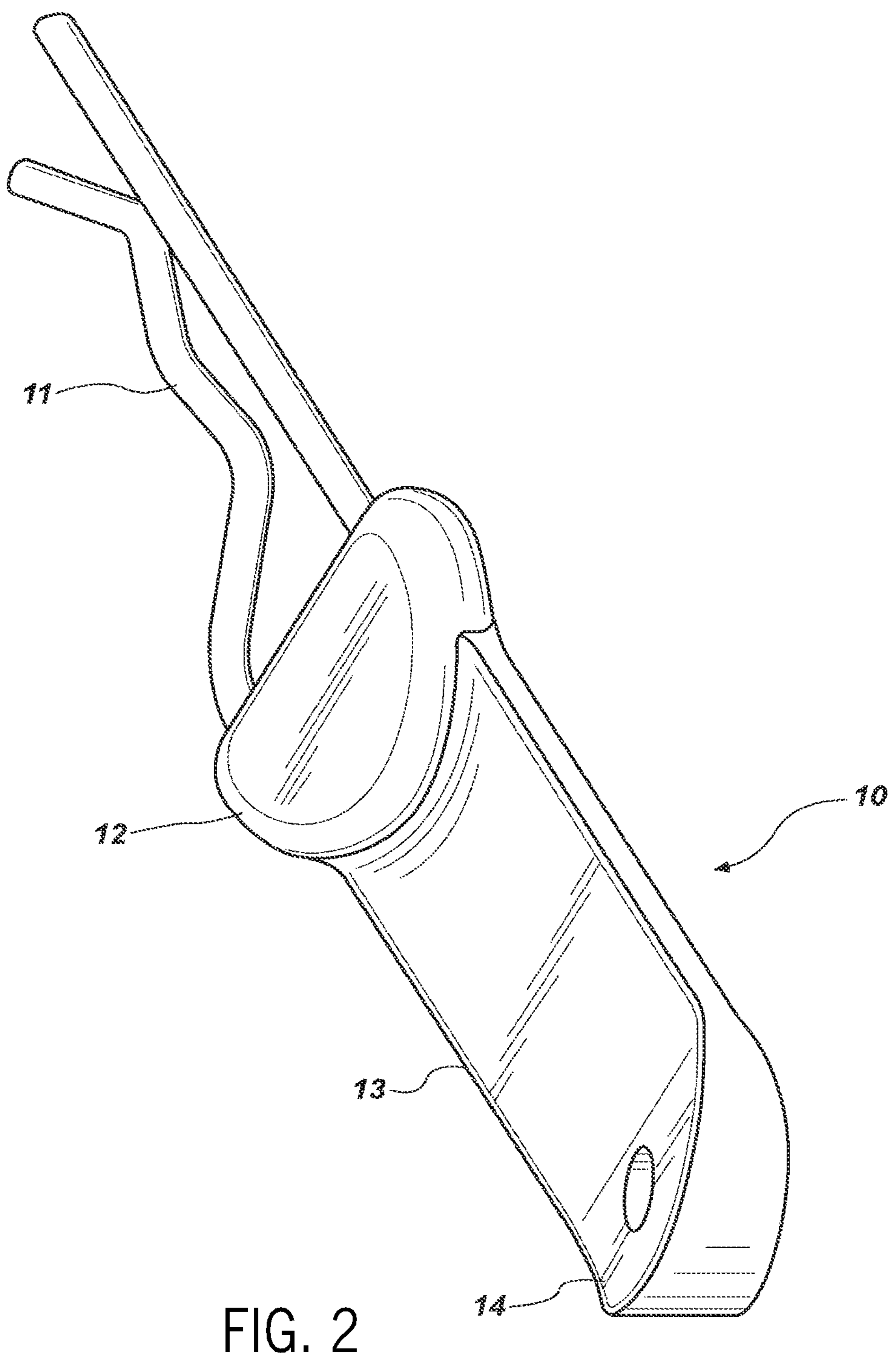
FIG. 2 is another perspective view of the pin assist device of FIG. 1.
Figure 4:
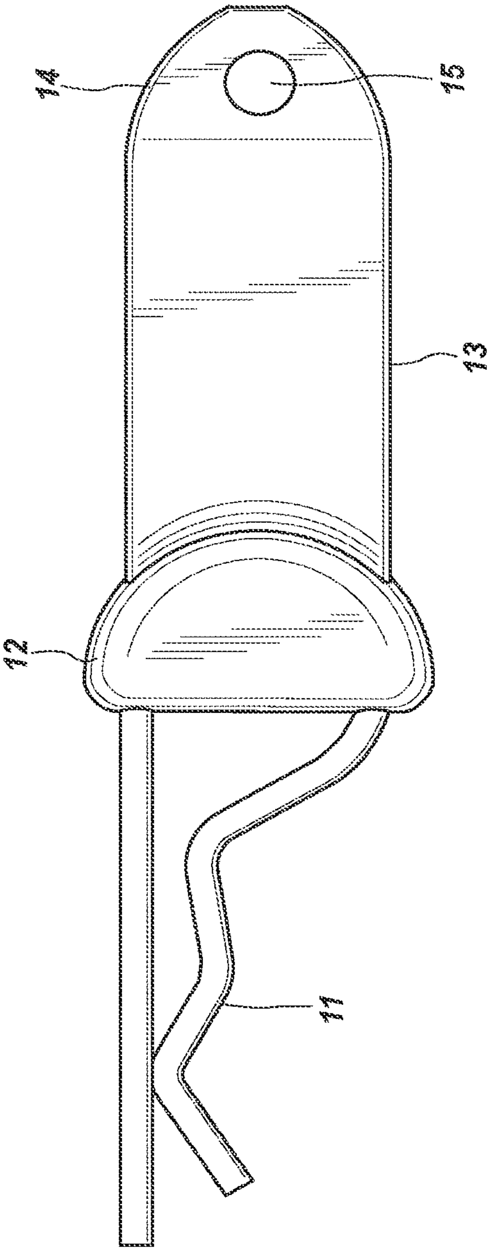
FIG. 4 is a bottom view of the pin assist device of FIG. 1.
Figure 7:
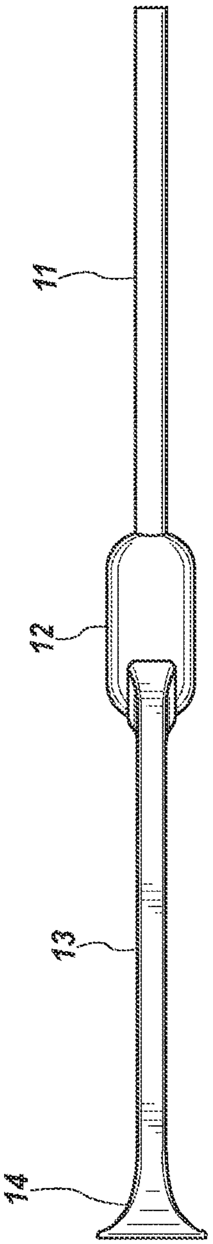
FIG. 7 is a top view of the pin assist device of FIG. 1.

In FIG. 2, FIG. 4, and FIG. 7, the difference in thickness between the insertion end 12, middle section 13 and extraction end 14 is shown. While the pin assist device 10 is illustrated as being fixedly attached to a cotter pin 11, it is understood that the pin assist device 10 could also be removably attached (e.g., coupled, locked, otherwise secured, etc.) to a cotter pin 11. In some embodiments, the pin assist device 10 comprises a removable coupling, such as at the insertion end 12 for removably attaching the pin assist device 10 to the cotter pin 11. The removable coupling may include, by way of nonlimiting example, a U-bolt, a threaded portion, a snap connector, hook and loop fasteners (e.g., VELCRO), or other means for coupling the pin assist device 10 to the cotter pin 11.

Although FIG. 1 through FIG. 9 show the pin assist device 10 and cotter pin 11 as comprising a single molded piece, in other embodiments, the pin assist device 10 may include two or more components that are secured or otherwise coupled to each other, at least one of which may be coupled to the cotter pin 11.

Figure 3:
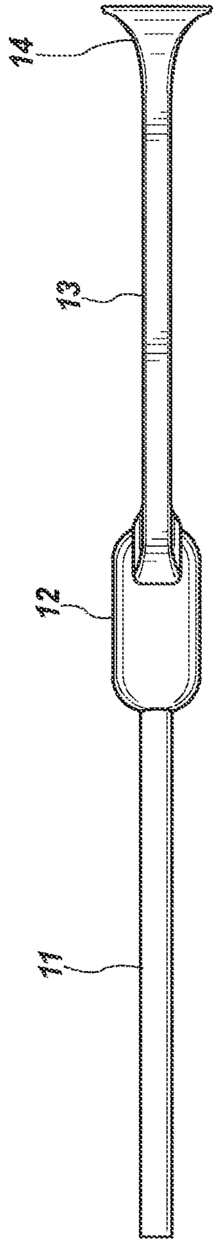
FIG. 3 is a side view of the pin assist device of FIG. 1.
Figure 6:
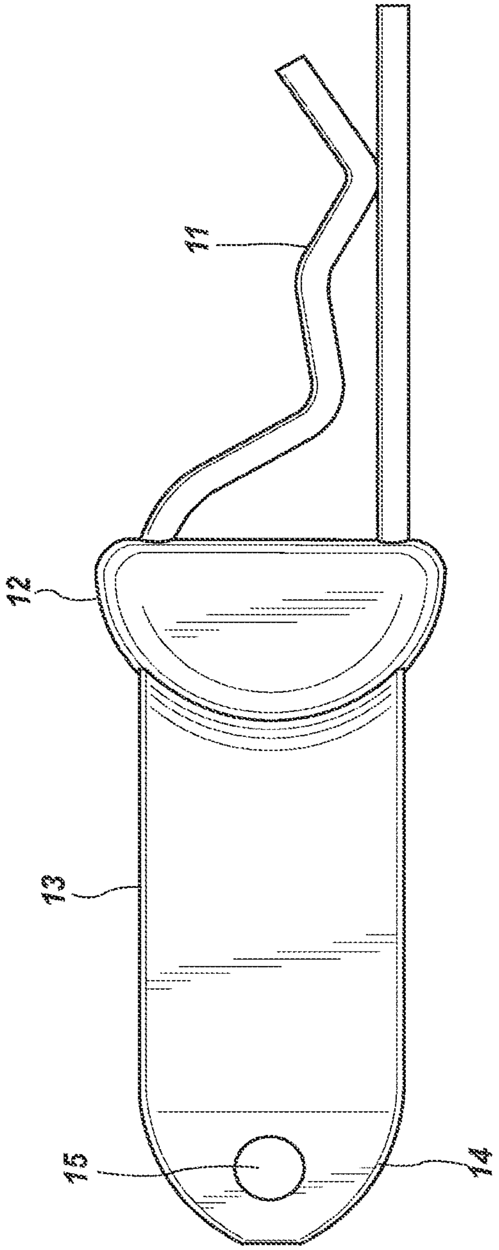
FIG. 6 is a side view of the pin assist device of FIG. 1.

FIG. 3 and FIG. 6 show opposite sides of the pin assist device 10 and illustrate that the insertion end 12 is created when the desired flexible material is formed around cotter pin 11. In other words, in some embodiments, the pin assist device 10 (such as the insertion end 12 thereof) may substantially surround an end of the cotter pin 11 and couple the pin assist device 10 to the cotter pin 11. In some embodiments, a hole 15 may be defined in the extraction end 14 of the device to allow for easy storage of the pin assist device.

Figure 5:
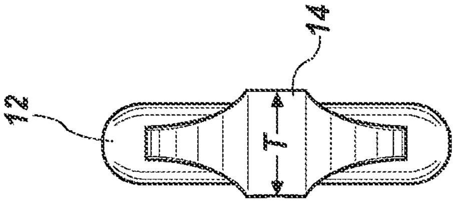
FIG. 5 is an end view of the pin assist device of FIG. 1.

FIG. 5 shows the thickness T of extraction end 14 of the pin assist device 10 in relation to middle section 13 and insertion end 12. The extraction end 14 can be easily grasped to assist in the extraction of a cotter pin. In some embodiments, the thickness of the extraction end 14 is greater than a thickness of the insertion end 12.

Figure 8:
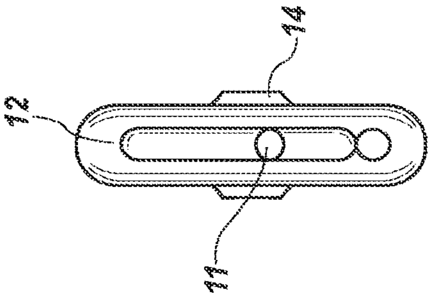
FIG. 8 is an end view of the pin assist device of FIG. 1.

FIG. 8 is an end perspective that shows cotter pin 11 in relation to the insertion end 12. In some embodiments, the thickness of insertion end 12 may enable a user to get a better grip of the cotter pin 11 to allow for easy insertion of the cotter pin 11.

Figure 9:
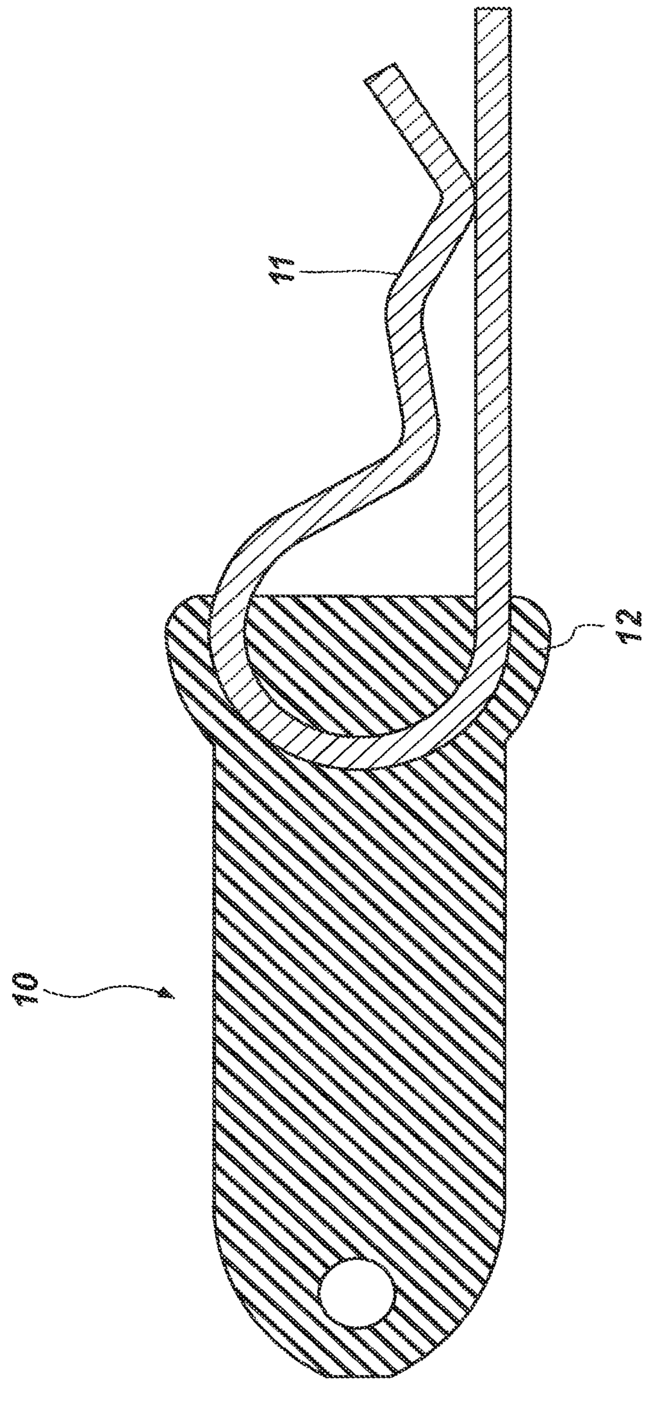
FIG. 9 is a cross-sectional side view showing the interior of the pin assist device of FIG. 1.

FIG. 9 is a cross-sectional side view showing a cutaway of the cotter pin assist device 1.0 and the cotter pin 1.1 and the location of the cotter pin 11 embedded in the flexible material on the insertion end 12 of the pin assist device 10. Although FIG. 9 illustrates the pin assist device 10 coupled to a cotter pin 11, the disclosure is not so limited. In other embodiments, a pin assist device may be coupled to another type of pin, such as a lynch pin (e.g., a linchpin, ring catch pin, ring latch pin), a locking pin (e.g., a safety pin, a snapper pin, a wire snap pin, a coupler locking pin, a square loop wire lock pin, a round loop wire lock pin, a shaft lock pin, etc.), a retaining pin, a hitch pin, a detent pin, a plunger pin, a clevis pin, etc.

Figure 11:
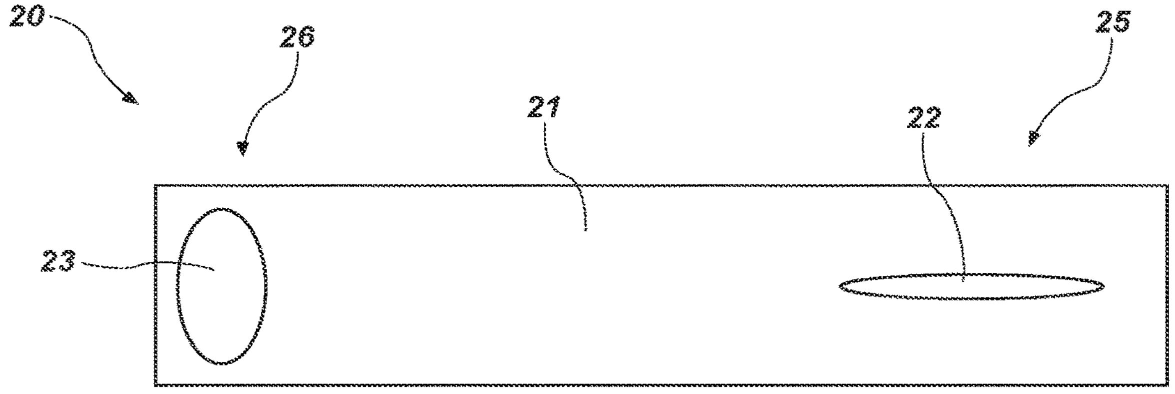
FIG. 11 is a top view of a pin assist device, in accordance with embodiments of the disclosure.
Figure 12:
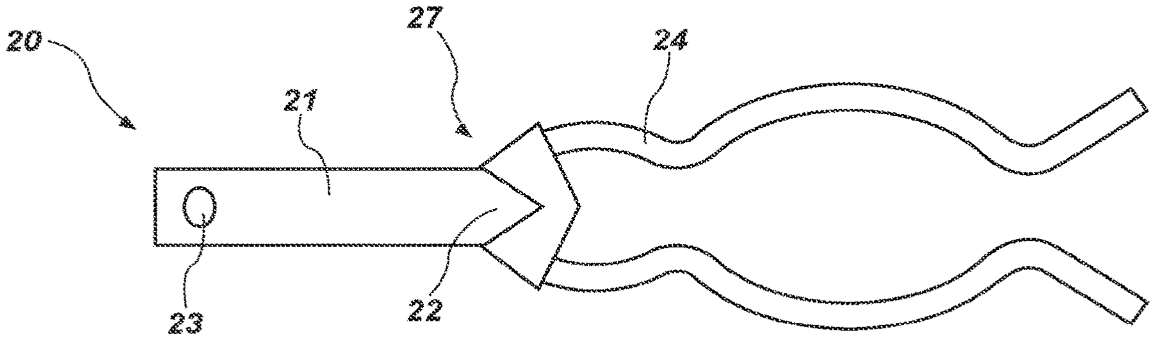
FIG. 12 is a top view of the pin assist device of FIG. 11.

Referring to FIG. 11 and FIG. 12, a pin assist device 20 is shown, in accordance with embodiments of the disclosure. FIG. 11 is a top view of the pin assist device 20 and FIG. 12 is a top view of the pin assist device 20 after the pin assist device 20 is coupled to a pin 24. The pin 24 may comprise a retaining pin, such as cotter pins, linchpins, locking pins, retaining pins, plunger pins, detent pins, clevis pins, and other locking or retaining pin.

In some embodiments, the pin assist device 20 may comprise a flexible strap 21. The flexible strap 21 may include an opening 22 on a first end 25 of the flexible strap 21 and a gripping element 23 on an opposing, second end 26 of the strap. The opening 22 may comprise an elongated opening 22 extending longitudinally along a length of the flexible strap 21. The flexible strap 21 may be removably coupled to the pin 24, by wrapping (e.g., enveloping, surrounding, sandwiching) around a portion of the pin 24 and inserting (e.g., threading) the second end 26 of the flexible strap 21 with the gripping element 23 through the opening 22 to form a wrapped portion 27, such as a lanyard hitch (e.g., ring hitch, larks head, cow hitch) knot, etc. In other words, in some embodiments, the flexible strap 21 may be coupled to the pin 24 with a lanyard hitch.

In some embodiments, the flexible strap 21 may include one or more clasps, buttons, snaps, hooks, rings, buckles, knots, etc., located and positioned to couple with a respective clasp, button, snap, hook, ring, buckle, etc. after wrapping the flexible strap 21 around the pin 24. Once the flexible strap 21 is coupled to the pin 24 the user may grasp the gripping element 23 to pull the pin 24 free (i.e., such as from a hitch pin). In other words, the gripping element 23 may be used to remove the pin 24 from a corresponding shaft (e.g., a hitch pin). In some embodiments, a wrapped portion 27 of the flexible strap 21 may provide a thicker area upon which the user may push to insert the pin 24. Accordingly, in some embodiments, a pin assist device 20 may be removable coupled to a pin 24.

Figure 13:
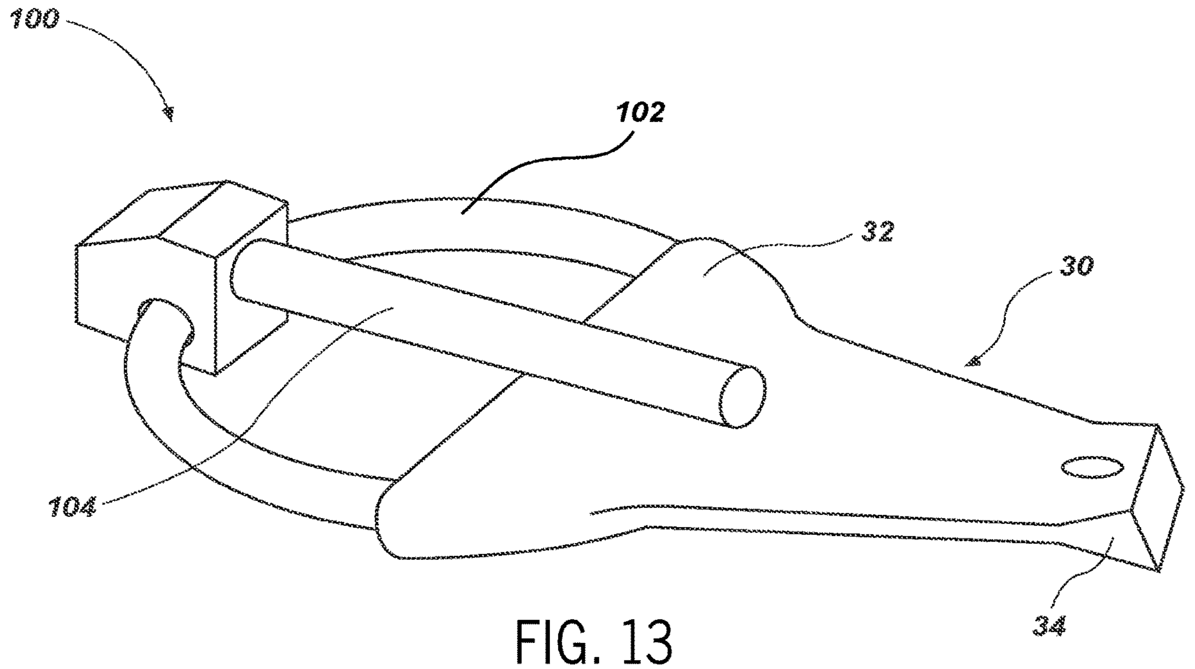
FIG. 13 is a perspective view of another pin assist device, in accordance with embodiments of the disclosure.

Referring to FIG. 13, a pin assist device 30 may be coupled to a lynch pin 100. A lynch pin 100 may comprise a locking element 102 (e.g., a ring, a pin latching accessory, a latching element, etc.) and a pin 104. The locking element 102 may be biased toward the pin 104 such that the locking element 102 maintains a clamping force against the pin 104. The pin assist device 30 may be coupled to the locking element 102 of the lynch pin 100. The locking element 102 may be attached (e.g., coupled) to an insertion end 32 of the pin assist device 20. A user may grip the pin assist device 30 at an extraction end 34 thereof and pull the pin assist device 30 to overcome the clamping force of the locking element 102 against the pin 104.

The pin assist device 30 may comprise a flexible (e.g., resilient) material, such as rubber, silicon, nylon, rope, leather, etc. in some embodiments, the pin assist device 30 is secured to the lynch pin 100, such as molded thereto. In other embodiments, the pin assist device 30 is removably attached to the lynch pin 100, such as with a buckle, a strap, hook and loop fasteners, one or more buttons, one or more snaps, etc. The insertion end 32 of the pin assist device 30 may encapsulate an end of the lynch pin 100. As described above with reference to the pin assist device 10 (FIG. 1), a thickness of the pin assist device 30 may vary across a length thereof. For example, the pin assist device 30 may have a greater thickness at the extraction end 34 and the insertion end 32 than at a middle portion thereof, which thicknesses may be the same as the thickness of the extraction end 14 and the thickness of the insertion end 12 of the pin assist device 10 described above with reference to FIG. 1 through FIG. 9.

Figure 14:
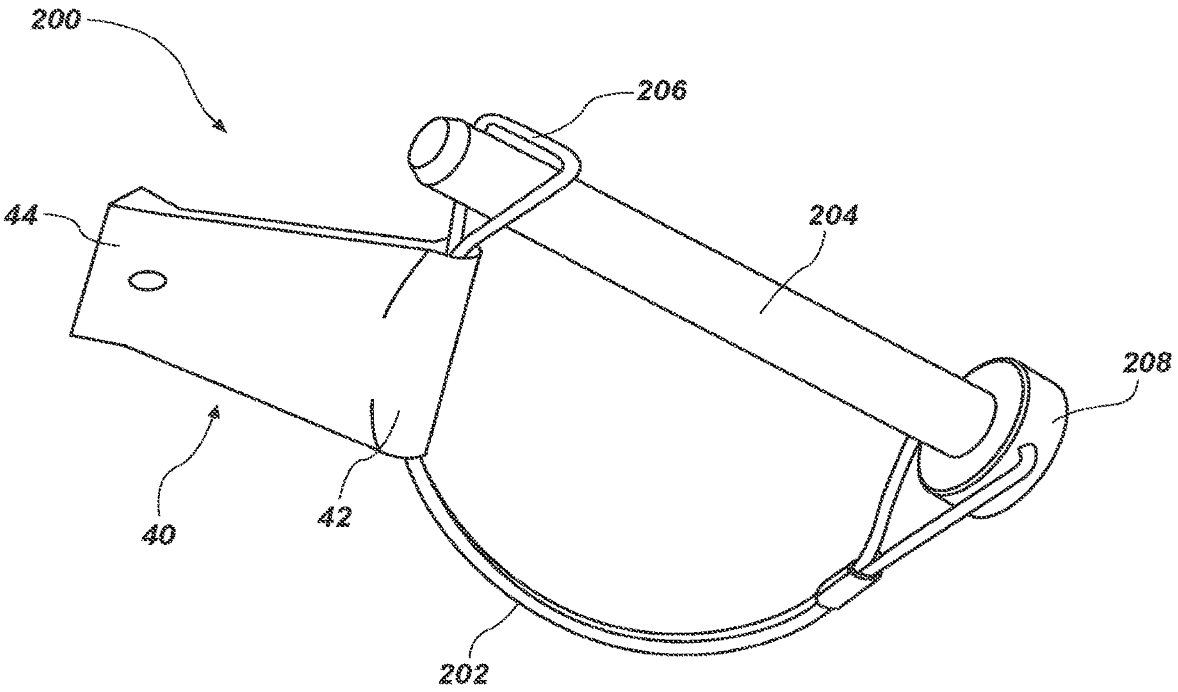
FIG. 14 is a perspective view of a pin assist device, in accordance with embodiments of the disclosure.

FIG. 14, is a pin assist device 40, in accordance with embodiments of the disclosure. The pin assist device 40 may be coupled to a locking pin (also referred to as a lock pin) 200. Although FIG. 14 illustrates a round loop wire lock pin 200, the disclosure is not so limited. In other embodiments, the locking pin 200 may comprise a safety pin, a snapper pin (e.g., a wire snap pin), coupler locking pin, a shaft lock pin, a loop wire lock pin (e.g., a square loop wire lock pin, etc.), another locking pin, etc. The pin assist device 40 may be coupled to any locking pins known in the art in a similar manner. The round loop wire lock pin 200 may comprise a wire loop 202 (e.g., pin latching accessory), a pin 204, a locking element 206 (e.g., mechanism pin catch, latching element), and a pin head 208 with the wire loop 202 rotatably connected to the pin head 208. When in a locked position, the pin 204 may be inserted into the locking element 206 of the wire loop 202. To release the round loop wire lock pin 200 from the locked position the pin 204 may be removed from the locking element 206, thereby allowing the wire loop 202 to rotate in a direction away from the pin 204. The pin assist device 40 may be coupled to the wire loop 202 at an insertion end 42 thereof. The user may grip the pin assist device 40 at an extraction end 44 thereof and pull to deflect the wire loop 202, removing the pin 204 from the locking element 206. The user may also grip the extraction end 44 and pull to deflect the wire loop 202 to insert the pin 204 into the locking element 206 In some embodiments, the pin assist device 40 may be rotatably coupled to the wire loop 202. In other words, in some such embodiments, the pin assist device 40 may be configured to rotate around the wire loop 202. Although FIG. 14 illustrates the pin assist device 40 coupled to the wire loop 202, the disclosure is not so limited. In other embodiments, the pin assist device 40 may be coupled to the locking element 206.

The pin assist device 40 may comprise a flexible (e.g., resilient) material, such as rubber, silicon, nylon, rope, leather, etc. In some embodiments, the pin assist device 40 is secured to the locking pin 200, such as molded thereto. In other embodiments, the pin assist device 40 is removably attached to the locking pin 200, such as with a buckle, a strap, hook and loop fasteners, one or more buttons, one or more snaps, etc.

As described above with reference to the pin assist device 10, a thickness of the pin assist device 4( ) may vary across a length thereof. For example, the pin assist device 40 may have a greater thickness at the extraction end 44 and the insertion end 42 than at a middle portion thereof, which thicknesses may be the same as the thickness of the extraction end 14 and the thickness of the insertion end 12 of the pin assist device 10 described above with reference to FIG. 1 through FIG. 9.

Figure 15:
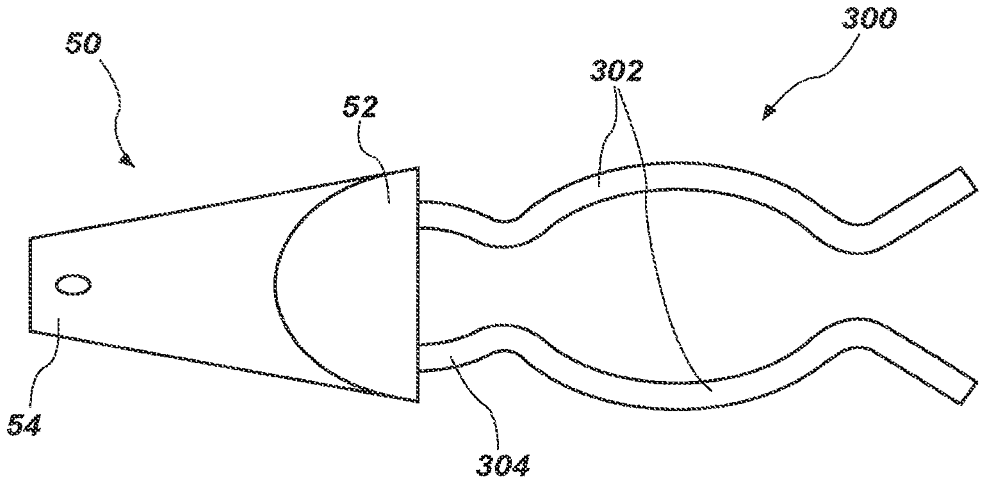
FIG. 15 is a top view of a pin assist device, in accordance with embodiments of the disclosure.

FIG. 15 is a top view of a pin assist device 50, in accordance with some embodiments of the disclosure. The pin assist device 50 may be coupled to an external hitch pin 300. The external hitch pin 300 may be configured similar to a cotter pin; however, the external hitch pin 300 may not have a straight section. For example, the external hitch pin 300 may include a curved latching section 302 configured to latch on the outside of an element. The external hitch pin 300 may further include a head section 304 connected to the curved latching section 302. The pin assist device 50 may be coupled to the external hitch pin 300 at the head section 304 of the external hitch pin 300. The user may apply a force to an insertion end 52 of the pin assist device 50 when inserting the external hitch pin 300 into, for example, a hitch pin or other retaining member. The user also may grip an extraction end 54 and pull to remove the external hitch pin 300. As described above with reference to the pin assist device 50, a thickness of the pin assist device 50 may vary across a length thereof. For example, the pin assist device 50 may have a greater thickness at the extraction end 54 and the insertion end 52 than at a middle portion thereof, which thicknesses may be the same as the thickness of the extraction end 14 and the thickness of the insertion end 1.2 of the pin assist device 10 described above with reference to FIG. 1 through FIG. 9.

The pin assist device 50 may comprise a flexible (e.g., resilient) material, such as rubber, silicon, nylon, rope, leather, etc. In some embodiments, the pin assist device 50 is secured to the external hitch pin 300, such as molded thereto. In other embodiments, the pin assist device 50 is removably attached to the external hitch pin 300, such as with a buckle, a strap, hook and loop fasteners, one or more buttons, one or more snaps, etc.

Figure 10:
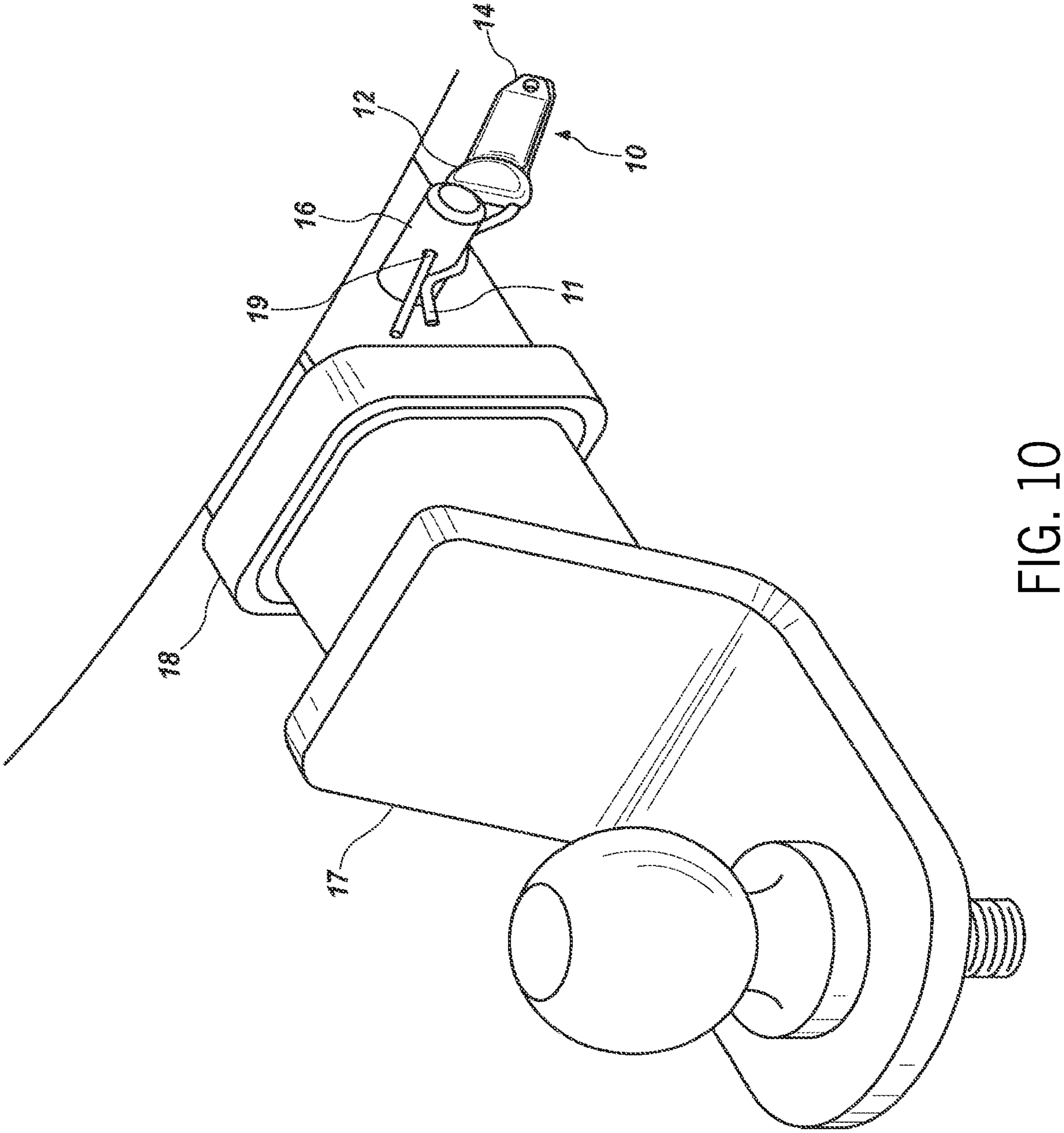
FIG. 10 is a perspective view showing an embodiment of the disclosure inserted into a hitch pin.

FIG. 10 shows a cotter pin 11 attached to pin assist device 10 inserted into a hitch pin 16. The hitch pin 16 is used to secure a hitch 17 to a receiver 18. The pin assist device 10 may be inserted by a user by gripping the pin assist device 10 at the insertion end 12 and pushing the cotter pin 11 through a hole 19 in the hitch pin 16. In order to remove the hitch pin 1.6, the user may grip the pin assist device 10 at the extraction end 14, extract cotter pin 11 and then remove the hitch pin 16. Once the hitch pin 16 is removed, the user can remove the hitch 17 from receiver 18. Although FIG. 10 illustrates the pin assist device 10, it is understood that the pin assist device may include any of the pin assist devices 10, 20, 30, 40, 50 described above with reference to FIG. 1 through FIG. 9 and FIG. 11 through FIG. 15.

Figure 16:
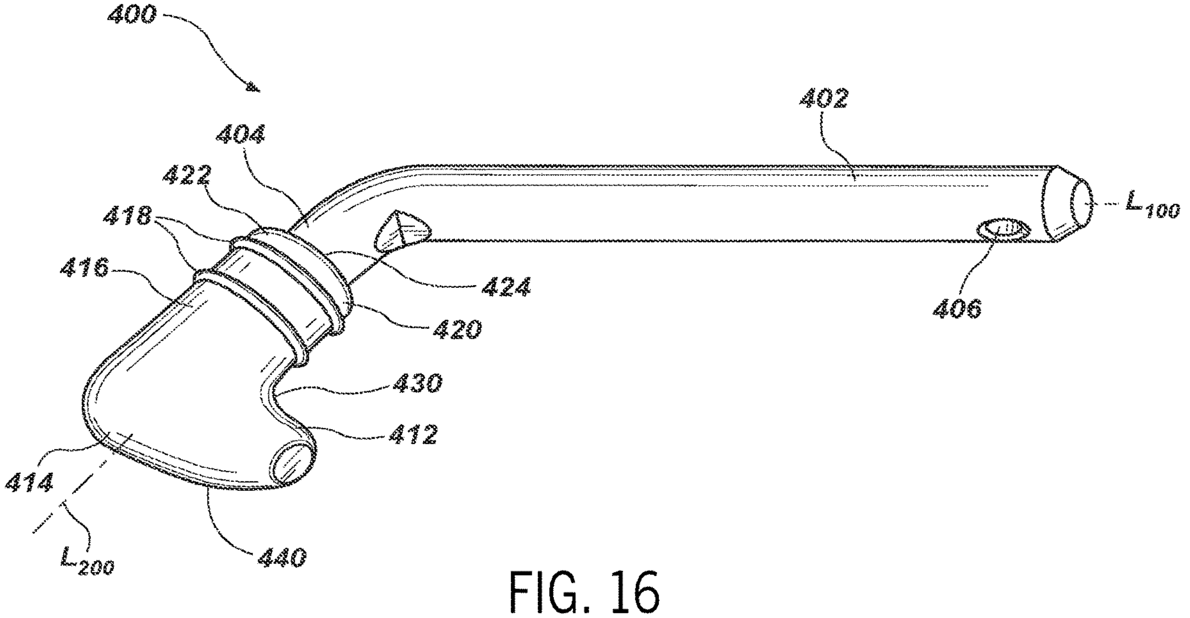
FIG. 16 is a side view of a hitch pin including a gripping element, in accordance with embodiments of the disclosure.

FIG. 16 is a perspective view of a hitch pin 400, in accordance with embodiments of the disclosure. The hitch pin 400 may be formed of metal materials such as, stainless steel, hardened and unhardened steel, brass, etc. The hitch pin 400 may include an elongate portion 402 (e.g., an elongate shaft) and a handle 404. In some embodiments, the elongate portion 402 may be cylindrical in shape and may extend along a longitudinal axis L100 thereof.

In use and operation the elongate portion 402 may be inserted through the receiver 18 (FIG. 10) and hitch 17 (FIG. 10) to secure the hitch 1.7 to the receiver 18. The user may grip the handle 404 when inserting and/or removing the hitch pin 400. The handle 404 may include a gripping element 416, including a curved surface 430. The curved surface 430 may have a radius of curvature between about 1.0 cm and about 3.0 cm, such as between about 1.0 cm and about 1.5 cm, between about 1.5 cm and about 2.0 cm, between about 2.0 cm and about 2.5 cm, or between about 2.5 cm and about 3.0 cm. In use and operation, a user may grasp the handle 404 and wrap a finger (e.g., an index finger) around the curved surface 430. A proximal end 440 of the hitch pin 400 may include an arcuate surface shaped and configured to be received in a palm of a user during insertion and extraction of the hitch pin 400.

In some embodiments, the elongate portion 402 may include a retaining pin receiver 406 positioned on the distal end of the elongate portion 402. The retaining pin receiver 406 may define a passageway (e.g., bore, hole, or opening) through the elongate portion 402 in a direction perpendicular to the longitudinal axis L100 of the elongate portion 402. The retaining pin receiver 406 may be configured to receive a retaining pin, such as one of the retaining pins described above with reference to FIG. 1 through FIG. 9 and FIG. 10 through FIG. 15 to secure the hitch pin 400 within the hitch 17 (FIG. 10) and receiver 18 (FIG. 10).

Figure 17:
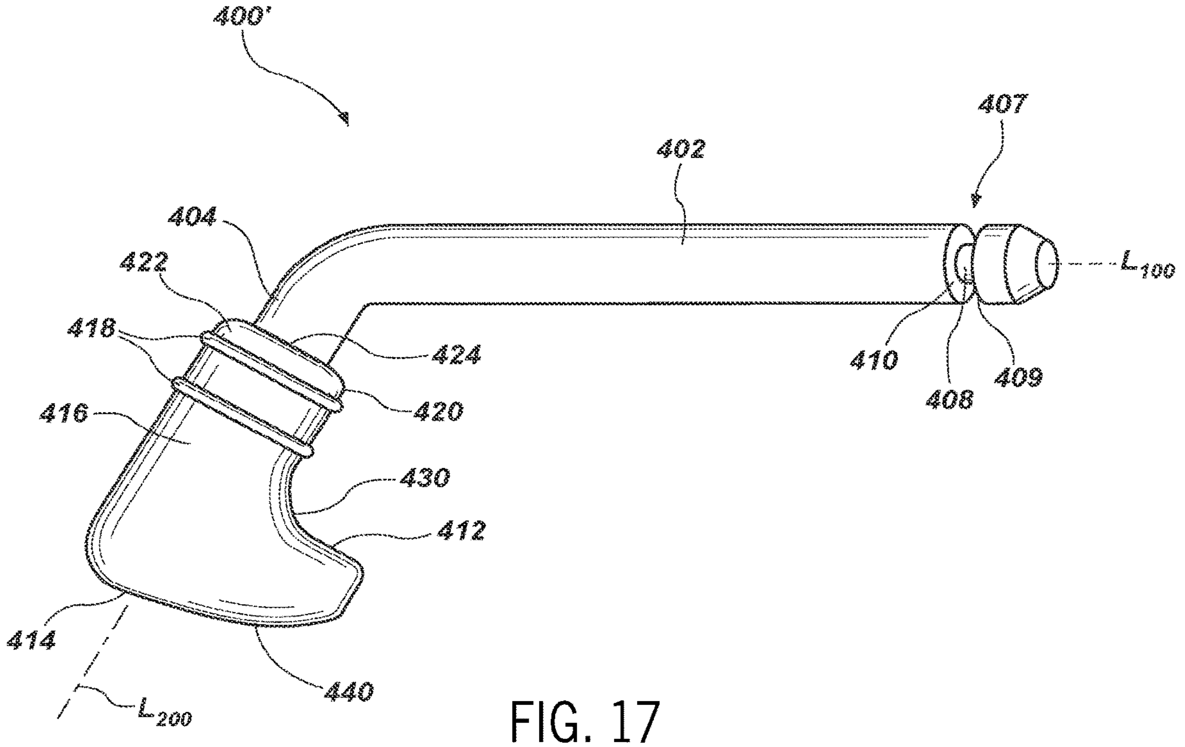
FIG. 17 is a perspective view of a hitch pin with a gripping element, in accordance with embodiments of the disclosure.

FIG. 17 illustrates a hitch pin 400' including a retaining pin receiver 407, in accordance with other embodiments of the disclosure. Some embodiments may utilize an annular groove at the distal end of the elongate portion 402 about (e.g., around) a longitudinal axis L100 of the retaining pin receiver 407. The annular groove may include a smaller diameter portion 408 (e.g., a neck) between a proximal shoulder 410 and a distal shoulder 409. A retaining pin (e.g., cotter pin, locking pin, reverse hitch pin, lynch pin, indent pin, plunger pin, clevis pin, etc.), such as one of the retaining pins described above with reference to FIG. 1 through FIG. 9 and FIG. 10 through FIG. 15 may clamp over the smaller diameter portion 408 for locking the hitch pin 400 in place.

Referring to FIGS. 16 and 17, the handle 404 may extend at an angle away from the longitudinal axis L400 of the elongate portion 402. The handle 404 may include at least one protrusion 412 on a base 414 thereof. The protrusion 412 may extend toward the distal end of the elongate portion 402. In some embodiments, the protrusion 412 extends toward the distal end of the elongate portion 402 in a direction parallel to the longitudinal axis L100 of the elongate portion 402. In some embodiments, the protrusion 412 extends at an angle between about 600 and about 1200 relative to an axis L200 of the handle, such as at an angle between about 60 and about 75°, between about 750 and about 90°, between about 900 and about 105°, or between about 1050 and about 120°. In some embodiments, the protrusion 412 extends at an angle of about 900 relative to the axis L200.

The protrusion 412 may be positioned and located such that in use and operation, at least one of finger of a user's hand may rest thereon when handling (e.g., inserting, extracting) the hitch pin 400, 400'. As described above, in some embodiments, the arcuate surface may be configured to be received in a palm of a user's hand. In some embodiments the protrusion 412 may be integrally formed with the handle 404. In other embodiments, the protrusion 412 may be formed individually and attached to the handle 404. The protrusion 412, may be 404 attached to the handle 404 by any suitable method. By way of nonlimiting example, the protrusion 412 may be welded, brazed, threaded, interference fit, molded, lashed, shrink fitted, attached with one or more adhesives, etc., to the handle 404.

In some embodiments, the handle 404 may include a gripping element 416 comprising a resilient material, a flexible material, or a material that is both resilient and flexible. The gripping element 416 may include a front portion 420 and a back portion 422, located further from the distal end of the elongate portion 402 than the front portion 420. The front portion 420 may be connected to the back portion 422 with side portions 424. Accordingly, in some embodiments, the gripping element 416 may substantially surround an entire circumference of the handle 404. The gripping element 416 may have a durometer (e.g., a type A durometer) between about 40 and about 90. In some embodiments, the durometer of the gripping element 416 may be between about 75 and about 85. The gripping element 416 may comprise rubber, foam, silicone, nylon, leather, another flexible material, and combinations thereof.

The gripping element 416 may have a thickness between about 1 mm and about 10 mm, such as between about 1 mm and about 2 mm, between about 2 mm and about 4 mm, between about 4 mm and about 6 mm, between about 6 mm and about 8 mm, or between about 8 mm and about 10 mm. In some embodiments, the thickness of the gripping element 416 may vary along a circumference thereof. In some such embodiments, the front portion 420 and the back portion 422 may have a thickness greater than a thickness of the side portions 424. In other embodiments the side portions 424 may be thicker than the front portion 420 and back portion 422. In yet other embodiments, the thickness may be different in each of the front portion 420, the back portion 422, and the side portions 424. In other embodiments, the thickness of the gripping element 416 may be substantially uniform around the circumference thereof.

In some embodiments, the gripping element 416 may be formed around at least portion of the handle 404. In some embodiments the gripping element 416 may be formed around the base 414 of the handle 404 and a top portion of the handle 404 may be exposed. In other embodiments, the gripping element 416 may cover substantially all surfaces of the entire handle 404 (e.g., substantially all surfaces of the bend portion of the hitch pin 400, 400').

The gripping element 416 may include at least one ridge 41.8. The at least one ridge 418 may protrude annularly about (e.g., around) a longitudinal axis L200 of the handle 404. The at least one ridge 41.8 may comprise a plurality of ridges spaced along the length of the handle 404. In some embodiments, the gripping element 416 includes two ridges extending around the handle 404.

Figure 18:
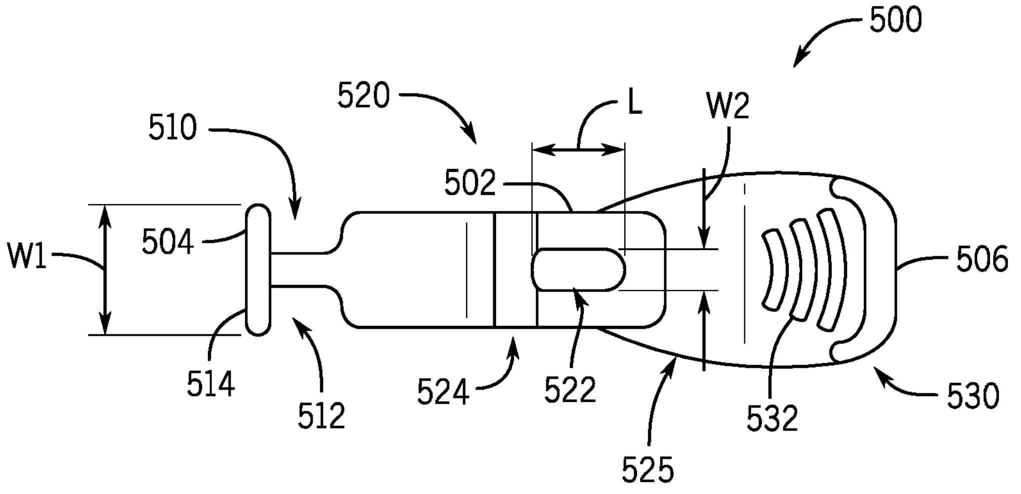
FIG. 18 is a top view of a pin assist device configured to be removably attachable to a retaining member according to one embodiment of the present disclosure.
Figure 19:
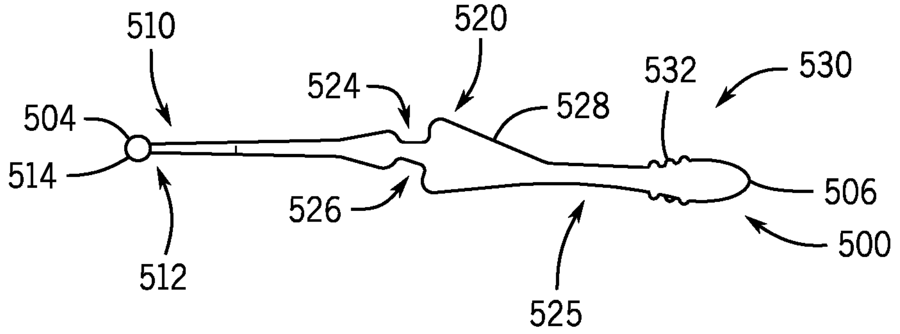
FIG. 19 is a side view of the pin assist device of FIG. 18.
Figure 20:
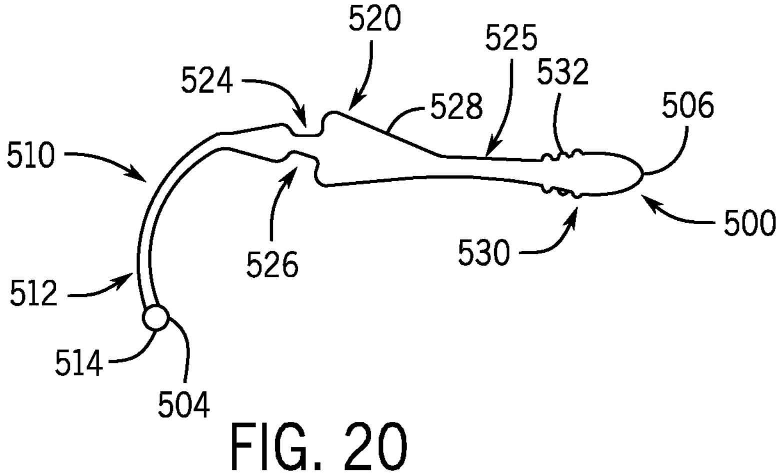
FIG. 20 is a side view of the pin assist device of FIG. 18 with a first end of the pin assist device bending downward back toward the pin assist device.

FIGS. 18-20 illustrates a retaining member assist device 500 according to one embodiment of the present disclosure. The retaining member assist device 500 may have many similar features to various pin assist devices described above. In one example, the retaining member assist device 500 includes a body 502 with a first end 504 and a second end 506. The body 502 of the retaining member assist device 500 may be made out of a flexible material (e.g., resilient material). FIG. 18 illustrates a top view of the retaining member assist device 500 in an open configuration, a bottom view of the retaining member assist device 500 is a mirror image of the top view. In the open configuration, the attachment portion 510 is not attached to the insertion end 520. FIG. 19 illustrates a side view of the retaining member assist device 500 in an open configuration, the left and right side views being mirror images of each other. FIG. 20 illustrates the first end 504 of the body 502 bending back toward the body 502 of retaining member assist device 500. FIG. 20 illustrates the first end 504 bending downward back toward the body 502, however, the first end 504 may also bend upward back toward the body 502.

In at least one example, the body 502 includes an attachment portion 510, an extraction portion 530, an insertion end 520, and a central portion 525 disposed between the insertion end 520 and the extraction portion 530. In some examples, the insertion end 520 includes the attachment portion 510 and the attachment portion is removably attachable to the insertion end 520. The attachment portion 510 of the retaining member assist device 500 enables the retaining member assist device 500 to be attached to a retaining member and removed from the retaining member. In one example, the retaining member assist device 500 may be attached to and detached from a retaining member or attached to a second retaining member after the retaining member assist device 500 is removed from a first retaining member.

Figure 21:
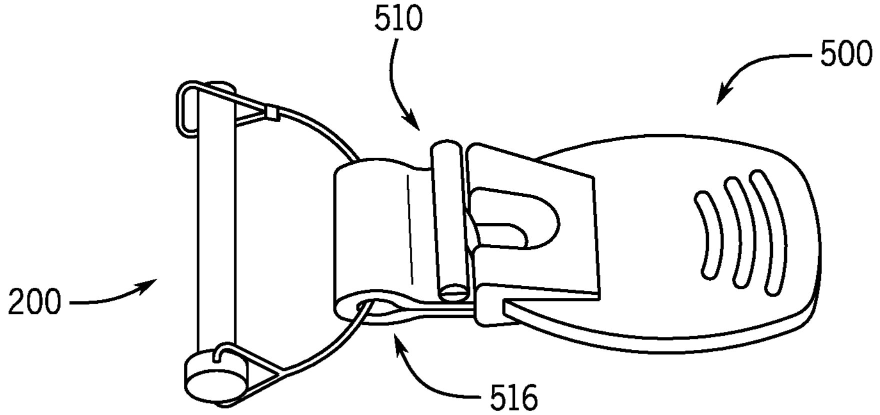
FIG. 21 is a perspective view of a pin assist device coupled to a locking member according to one embodiment of the present disclosure.

The attachment portion 510 includes the first end 504. The attachment portion 510 is removably attachable to a retaining member, such as a cotter pin, a lynch pin, a locking pin, a plunger pin, a detent pin, a clevis pin, and the like. FIG. 21 illustrates the attachment portion 510 of the retaining member assist device 500 in a closed configuration attached to a locking pin 200. The attachment portion 510 may form a loop 516 that fully wraps around a portion of the locking pin 200. The attachment portion 510 is wrapped around a top surface, a bottom surface, an outer surface, and an inner surface of the portion of the locking pin 200. In the closed configuration, the attachment portion 510 is attached to the insertion end 520 to secure the retaining member assist device 500 to the locking pin 200.

In some embodiments, the loop 516 of the attachment portion 510, when it is attached to the retaining member, such as the illustrated locking pin 200, may be loose enabling the loop 516 to slide along the locking pin 200. In some circumstances, this may be beneficial as it may enable the user to adjust the angle at which the force is applied to the locking pin 200 through the retaining member assist device 500. In some embodiments, the loop 516 of the attachment portion 510, when it is attached to the retaining member, for example the illustrated locking pin 200, may be tight to prevent the locking pin 200 from sliding through or relative to the loop 516.

In at least one example, the attachment portion 510 can include an attachment mechanism 512. The attachment mechanism 512 is configured to be reversibly coupleable to the insertion end 520 of the retaining member assist device 500. For example, in some embodiments, the attachment mechanism 512 can be configured to slide into an aperture 522 defined by the insertion end 520.

Once the attachment mechanism 512 is extended through the aperture 522, the attachment mechanism 512 can be oriented and configured to be secured in place against the insertion end 520 with the attachment portion extending through the aperture 522. When a force is applied by a user or other external force to the retaining member assist device 500 through the extraction portion 530, as discussed below, the attachment mechanism 512 is oriented to extend across the aperture 522 to resist being pulled back through the aperture 522.

In some embodiments, when the attachment mechanism 512 is in a first configuration or in a default configuration or orientation, the attachment mechanism 512 is unable to extend through or slide through the aperture 522. When the attachment mechanism 512 is rotated into a second configuration or orientation, the attachment mechanism 512 is able to extend through or slide through the aperture 522. Once the attachment mechanism 512 has extended though or slid through the aperture 522, the attachment mechanism 512 may be returned to the first configuration or default configuration and the attachment mechanism 512 is unable to extend through or slide through the aperture 522. The user may manually rotate the attachment mechanism 512 back to the first configuration or default configuration, or the attachment mechanism may bias back to the first configuration or default configuration, due to the elastic material nature of the body 502 of the retaining member assist device 500.

In the illustrated embodiment, the attachment mechanism 512 may comprise a T-shape and the aperture 522 comprises an oval shape. The width W1 of a top 514 of T-shaped attachment mechanism 512 may be wider than a width W2 of the aperture 522 so that the T-shape cannot slide into the aperture 522 when the T-shaped attachment mechanism 512 is in the first configuration or default configuration.

The T-shaped attachment mechanism 512 may be rotated 90 degrees, or other sufficient degrees, to a second configuration so that the width W1 of the top 514 of the T-shaped attachment mechanism 512 aligns with the oval aperture 522 that enables the top 514 of the T-shaped attachment mechanism 512 to extend through or slide through the oval aperture 522. In some embodiments, a length L of the oval aperture 522 may be greater than the width W1 of the top 514 of the T-shaped attachment mechanism 512, or may be less than the width W1 of the top 514 of the T-shaped attachment mechanism 512, or may be the same dimension of the width W1 of the top 514 of the T-shaped attachment mechanism 512. When the width W1 of the top 514 of the T-shaped attachment mechanism 512 is greater than the length L of the oval aperture 522, the top 514 of the T-shaped attachment mechanism 512 may be angled and urged through the oval aperture 522.

While the attachment mechanism 512 is illustrated with a T-shape and the aperture 522 is illustrated with an oval shape, the attachment mechanism 512 may have a variety of different shapes and the aperture 522 may have a variety of different shapes that that are configured to interact with each other so that the attachment mechanism 512 is configured to not extend through the aperture 522 in a first configuration and the attachment mechanism 512 is configured to extend through or slide through the aperture 522 in a second configuration.

The insertion end 520 further includes a first groove 524 disposed on a top surface of the body 502 and a second groove 526 disposed on a bottom surface of the body 502. The first groove 524 and the second groove 526 extend laterally across the body 502 from a first lateral side to a second lateral side. The first groove 524 or the second groove 526 is configured to receive the attachment mechanism 512 in the first configuration after the attachment mechanism 512 has extended through or slid through the aperture 522. The illustrated first groove 524 and the second groove 526 have a corresponding shape to the top 514 of the T-shaped attachment mechanism 512.

The insertion end 520 further includes a retention feature 528 that is disposed next to the first groove 524 and the second groove 526 and secures the attachment mechanism 512 in the first groove 524 or the second groove 526 when a tension is applied to the extraction portion 530, discussed in further detail below. The retention feature 528 is disposed closer to the second end 506 than the first groove 524 and the second groove 526. The thickness of the retention feature 528 is greater than the thickness of the first groove 524 and the second groove 526. In other words, the retention feature 528 acts as backstop to prevent the attachment mechanism 512 from sliding toward the second end 506.

In at least one example, the extraction portion 530 of the retaining member assist device 500 can be configured to provide a portion of the body 502 for a user to grip to extract the retaining member from another member, such as a hitch pin or a trailer hitch (e.g., a draw bar), a hitch receiver, and the like, similar to other examples described herein. For example, when a user desires to remove a cotter pin from a trailer hitch, the user may attach and secure the retaining member assist device 500 to a portion of the cotter pin if the retaining member assist device 500 is not already attached. The user may then apply a force to the cotter pin by pulling on the extraction portion 530 of the retaining member assist device 500 to remove the cotter pin from the trailer hitch.

The extraction portion 530 includes the second end 506. The extraction portion 530 comprises a gripping feature 532. The gripping feature 532 may include a textured surface to help the user grip the extraction portion 530. In some embodiments, the textured surface of the gripping feature 532 may include one or more bumps, ridges, grooves, holes, protrusions, and the like. In some embodiments, the gripping feature 532 may have a high surface roughness. In some embodiments, the gripping feature 532 may be fabricated from a material with a coefficient of friction between about 0.7 and about 1.3.

In some embodiments, the extraction portion 530 may be thicker than the insertion end 520 of the retaining member assist device 500. In some embodiments, the gripping feature 532 the extraction portion 530 may comprise a tapered surface that is thicker at the second end 506 than the insertion end 520. In some embodiments, the extraction portion 530 includes a surface extending away from a major plane of the insertion end 520 to form the gripping feature 532 that is thicker than the insertion end 520.

Figure 22:
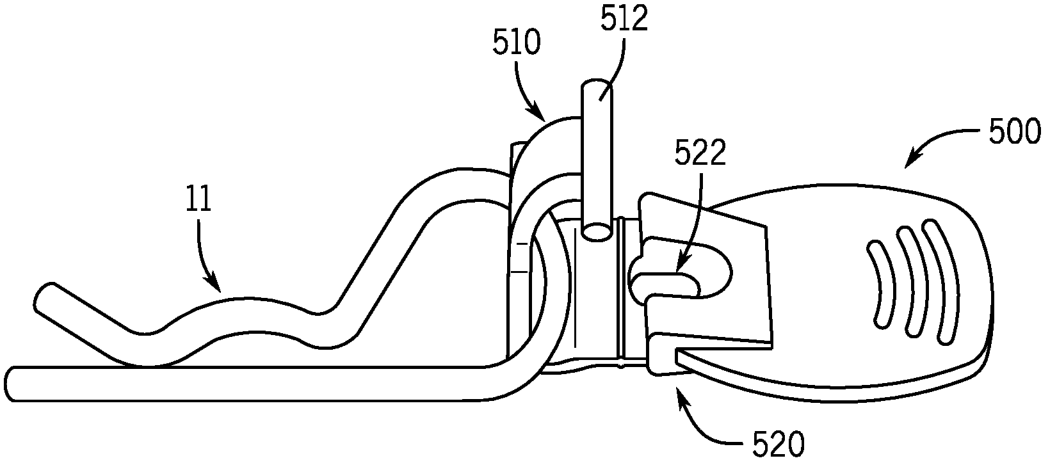
FIG. 22 is a perspective view of a pin assist device looping around a cotter pin according to one embodiment of the present disclosure.
Figure 23:
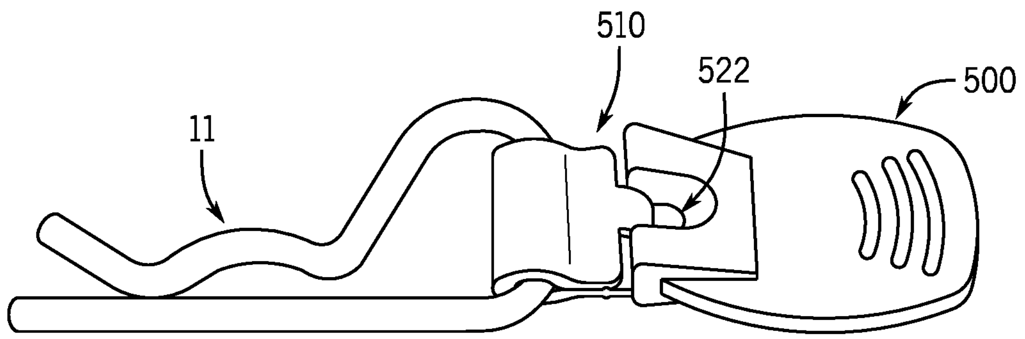
FIG. 23 is a perspective view of an attachment mechanism of the pin assist device of FIG. 22 sliding through an aperture of the pin assist device.
Figure 24:
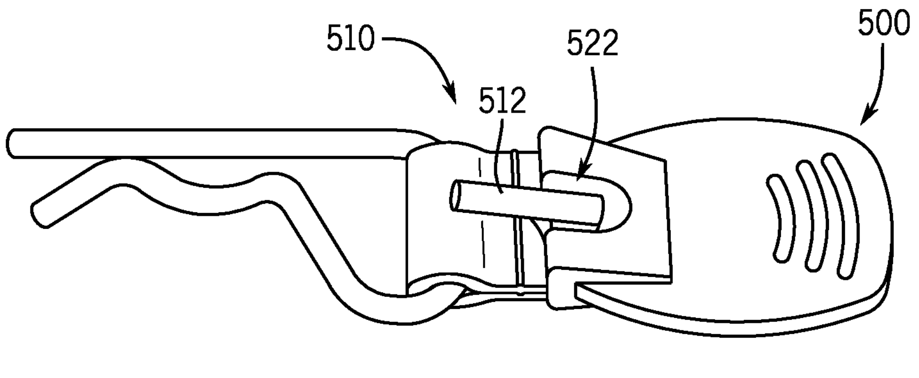
FIG. 24 is a perspective view of the attachment mechanism of the pin assist device of FIG. 22 in a second configuration and sliding through the aperture.
Figure 25:
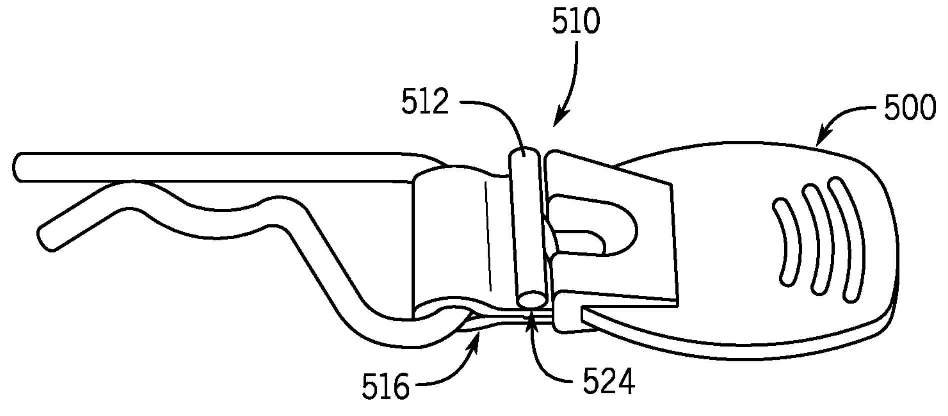
FIG. 25 is a perspective view of the attachment mechanism of the pin assists device of FIG. 22 in a first configuration and placed into a groove of pin assist device.

FIGS. 22-25 illustrate the process of attaching the retaining member assist device 500 to a retaining member, such as a cotter pin 11. FIG. 22 illustrates the retaining member assist device 500 in an open configuration and looping the attachment portion 510 of the retaining member assist device 500 around a portion of a cotter pin 11. In the open configuration, the attachment mechanism 512 is not engaged with the aperture 522 and the attachment portion 510 is not attached to the insertion end 520. FIGS. 23 and 24 illustrates rotating the attachment mechanism 512 of the attachment portion 510 to the second configuration and extending the attachment mechanism 512 through the aperture 522. FIG. 23 illustrates a first surface of the retaining member assist device 500 and FIG. 24 illustrates a second surface of the retaining member assist device 500 opposite the first surface. FIG. 25 illustrates rotating the attachment mechanism 512 back to the first configuration to secure the attachment mechanism 512 in the first groove 524, with the retaining member assist device 500 in the closed configuration. In some embodiments, the retaining member assist device 500 is fabricated from a resilient material and the attachment mechanism 512 may be biased to return to the first configuration or the default configuration once released by the user. Once the attachment mechanism 512 is secured the attachment portion 510 forms the loop 516 around the cotter pin 11. Once the retaining member assist device 500 is attached to the retaining member, for example the cotter pin 11, the user may apply a force to the extraction portion 530. In some circumstances, the angle of the retaining member assist device 500 relative to the cotter pin 11 may be adjusted by removing the retaining member assist device 500 from the cotter pin 11 and reattaching or sliding the retaining member assist device 500 relative to the cotter pin 11 for a better angle to remove the cotter pin 11 from another member (e.g., a trailer hitch). The retaining member assist device 500 may be attached to the cotter pin 11 before inserting the cotter pin 11 to another member or after the cotter pin 11 has been attached to the other member.

The process may be reversed to remove the retaining member assist device 500 from a retaining member. For example, the attachment mechanism 512 may be rotated from the first configuration to the second configuration so that the attachment mechanism 512 can extend through the aperture 522. Once the attachment mechanism 512 has extended through the aperture 522, the attachment mechanism 512 may be rotated back to the first configuration or the attachment mechanism 512 may be biased back to the first configuration or the default configuration due to the resilient material.

Figure 26:
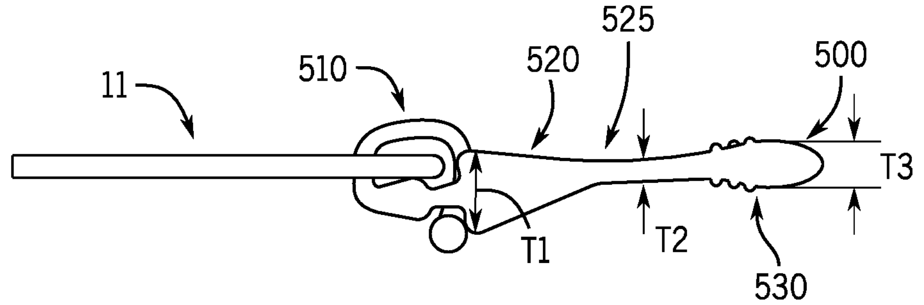
FIG. 26 is a side view of the pin assist device of FIG. 22 attached to the cotter pin.

FIG. 26 illustrates a side view of the retaining member assist device 500 in the closed configuration attached to the cotter pin 11 to provide a view of the relative thicknesses of the retaining member assist device 500 in the closed configuration to a retaining member versus the open configuration. The insertion end 520 includes the attachment portion 510 that is coupled to the insertion end 520. In the illustrated example of FIG. 26, the insertion end 520 has a first thickness T1, the central portion 525 has a second thickness T2, and the extraction portion 530 has a third thickness T3. In one example, the first thickness T1 of the insertion end 520 is thicker than the second thickness T2 of the central portion 525. In one example, the third thickness T3 of the extraction portion 530 is thicker than the second thickness T2 of the central portion 525. In one example, the first thickness T1 of the insertion end is thicker than the third thickness T3 of the extraction portion 530. Accordingly, the second thickness T2 of the central portion 525 is thinner than the first thickness T1 of the insertion end 520 and the third thickness T3 of the extraction portion 530.

The description of the invention above should not be interpreted as limiting the invention to the disclosed embodiment because those who are skilled in the art to which the invention relates will be able to devise other equivalent forms thereof within the scope of the invention. Variations and changes, which are obvious to one skilled in the art, are intended to be within the scope and nature of the present invention.

What is claimed is:

1. A retaining member assist device comprising a body having a first end and a second end, wherein:

the body includes:

an attachment portion comprising the first end;

an extraction portion comprising the second end;

an insertion end removably attachable to the attachment portion; and a central portion disposed between the insertion end and the extraction portion;

the attachment portion of the body is removably attachable to a retaining member; and the body comprises a unitary material defining the attachment portion, the extraction portion, the insertion end, and the central portion.

2. The retaining member assist device of claim 1, wherein the attachment portion of the body comprises a loop configured to secure the retaining member assist device to the retaining member.

3. The retaining member assist device of claim 1, wherein:

the first end of the body is reversibly coupleable to the insertion end; and the attachment portion is configured to form a loop.

4. The retaining member assist device of claim 3, wherein when the loop is configured to secure to and slidably engage the retaining member.

5. The retaining member assist device of claim 1, wherein:

the first end of the body includes an attachment mechanism; and the insertion end of the body comprises an aperture;

the attachment mechanism is configured to extend through the aperture.

6. The retaining member assist device of claim 5, wherein:

in a first configuration, the attachment mechanism is unable to extend through the aperture; and in a second configuration, the attachment mechanism is configured to extend through the aperture.

7. The retaining member assist device of claim 6, wherein:

the attachment mechanism comprises a T-shape; and the aperture defines an elongate shape.

8. The retaining member assist device of claim 6, wherein:

the body comprises a groove extending laterally across a first surface of the body;

in a closed configuration, the groove receives the attachment mechanism; and in the closed configuration, the attachment portion forms a loop after the attachment mechanism is secured in the groove.

9. The retaining member assist device of claim 8, wherein:

the groove is a first groove;

the body comprises a second groove extending laterally across a second surface of the body opposite the first surface;

in the closed configuration, the first groove or the second groove receives the attachment mechanism; and in the closed configuration, the attachment portion forms the loop.

10. The retaining member assist device of claim 9, wherein the body further comprises a retention feature disposed next to the first groove and the second groove and secures the attachment mechanism in the first groove or the second groove when tension is attached to the extraction portion; and wherein the retention feature is closer to the second end than the first groove or the second groove.

11. The retaining member assist device of claim 1, wherein the extraction portion of the body comprises a gripping feature including a textured surface.

12. The retaining member assist device of claim 1, wherein the extraction portion comprises a tapered surface forming a gripping feature thicker than the central portion.

13. The retaining member assist device of claim 1, wherein the extraction portion includes a surface extending away from a major plane of the central portion to form a gripping feature thicker than the central portion.

14. The retaining member assist device of claim 1, wherein the body comprises a flexible material.

15. A retaining member assist device comprising a body having a first end and a second end, wherein:

the body includes:

an attachment portion comprising an attachment mechanism at the first end;

an insertion end removably attachable to the attachment portion;

an extraction portion comprising the second end; and a central portion disposed between the insertion end and the extraction portion;

the central portion is thinner than the insertion end and the extraction portion;

the attachment portion is removably attachable to a retaining member and is wrapped fully around a portion of the retaining member when the attachment portion is attached to the retaining member; and the insertion end is selectively removably attachable to the attachment portion by rotating the attachment mechanism between a first configuration and a second configuration.

16. The retaining member assist device of claim 15, wherein the attachment portion of the body is configured to form a loop.

17. The retaining member assist device of claim 15, wherein the attachment portion of the body is configured to wrapped around a top surface, a bottom surface, an outer surface, and an inner surface of the portion of the retaining member when the attachment portion is attached to the retaining member.

18. A retaining member assist device comprising a body with a first end and a second end, wherein:

the body includes:

an attachment portion that includes an attachment mechanism at the first end;

an insertion end defining an aperture;

an extraction portion that includes the second end; and a central portion disposed between the attachment portion and the insertion end;

the attachment mechanism is slidable through the aperture so that the attachment portion of the body is removably attachable to a retaining member; and the attachment mechanism is T-shaped.

19. The retaining member assist device of claim 18, wherein:

the retaining member assist device comprises an open configuration in which the attachment mechanism is not engaged with the aperture; and the retaining member assist device comprises a closed configuration with the attachment mechanism slid through the aperture and secured to the insertion end.

20. The retaining member assist device of claim 19, wherein:

the body comprises:

a first groove extending laterally across a first surface of the body; and a second groove extending laterally across a second surface of the body opposite the first surface;

in the closed configuration, the first groove or the second groove receive the attachment mechanism and the first groove or the second groove secures the attachment mechanism in place; and in the closed configuration, the attachment portion forms a loop.

* * * * *